(12) United States Patent
Ciaffarafa et al.

(10) Patent No.: US 11,585,604 B2
(45) Date of Patent: Feb. 21, 2023

(54) HEAT EXCHANGER

(71) Applicant: DENSO Marston Ltd., Shipley (GB)

(72) Inventors: Mario Ciaffarafa, West Yorkshire (GB); Mark Stickland, West Yorkshire (GB)

(73) Assignee: DENSO Marston Ltd., Shipley (GB)

( * ) Notice: Subject to any disclaimer, the term of this patent is extended or adjusted under 35 U.S.C. 154(b) by 94 days.

(21) Appl. No.: 17/080,877

(22) Filed: Oct. 27, 2020

(65) Prior Publication Data

US 2021/0131739 A1    May 6, 2021

(30) Foreign Application Priority Data

Oct. 30, 2019 (GB) ...................................... 1915724

(51) Int. Cl.
*F28D 9/00* (2006.01)
*F28F 9/02* (2006.01)

(52) U.S. Cl.
CPC .............. *F28D 9/0062* (2013.01); *F28F 9/02* (2013.01)

(58) Field of Classification Search
CPC ......... F28D 9/0062; F28F 9/02; F28F 9/0219; F28F 9/04; F28F 9/00
See application file for complete search history.

(56) References Cited

U.S. PATENT DOCUMENTS

| | | | |
|---|---|---|---|
| 4,733,722 A | 3/1988 | Forbes et al. | |
| 6,595,274 B2* | 7/2003 | Hayashi | ......... F28F 3/025 165/158 |
| 8,800,642 B2* | 8/2014 | Ninagawa | ............... F28F 9/001 165/149 |
| 8,967,235 B2* | 3/2015 | Baumann | ............... F28F 1/422 165/158 |
| 2003/0010479 A1 | 1/2003 | Hayashi et al. | |
| 2003/0019616 A1 | 1/2003 | Hayashi et al. | |
| 2005/0126768 A1* | 6/2005 | Dilley | ................... F28F 9/0219 165/157 |
| 2010/0089548 A1* | 4/2010 | Braic | ................... F28D 7/1692 165/72 |
| 2013/0192803 A1* | 8/2013 | Garret | ................... F28D 1/0233 165/151 |

FOREIGN PATENT DOCUMENTS

| | | | | |
|---|---|---|---|---|
| EP | 3106821 A1 | 12/2016 | | |
| ES | 2260971 A1 | 11/2006 | | |
| FR | 2251794 A1 | 6/1975 | | |
| GB | 2344161 A | 5/2000 | | |
| JP | 2007077839 A | * | 3/2007 | ............... F28D 7/16 |
| WO | WO-2016136782 A1 | 9/2016 | | |

* cited by examiner

*Primary Examiner* — Tho V Duong
(74) *Attorney, Agent, or Firm* — Harness, Dickey & Pierce, P.L.C.

(57) ABSTRACT

A tube type heat exchanger includes a core includes multiple tubes, a header plate defining an array of apertures in which said tubes are received, and a coolant jacket arranged about said core. The header plate includes a body defining a central region and an edge region circumferential to said central region. The central region defines said array of apertures. The edge region includes a flange. The header plate is connected to the coolant jacket via first and second contact areas between the header plate and the coolant jacket. The flange is outboard of the coolant jacket. The first contact area is between the flange and the coolant jacket; and the second contact area is inboard of the first contact area.

22 Claims, 20 Drawing Sheets

HEAT EXCHANGER

CROSS REFERENCE TO RELATED APPLICATION

This application is based on UK Patent Application No. GB 1915724.7 filed on Oct. 30, 2019, the disclosure of which is incorporated herein by reference in its entirety.

TECHNICAL FIELD

The present invention relates to a tube type heat exchanger, and to a method of assembling a tube type heat exchanger.

BACKGROUND

It is known to use a tube type heat exchanger to cool a fluid stream using a liquid, where the fluid stream to be cooled (such as charge air) flows inside tubes, and the liquid coolant flows outside the tubes. The liquid coolant is contained within a coolant jacket.

SUMMARY

A tube type heat exchanger includes a core, a header plate, and a coolant jacket. The core includes multiple tubes. The header plate an array of apertures in which said tubes are received. The coolant jacket is arranged about said core. The header plate includes a body defining a central region and an edge region circumferential to said central region. The central region defines said array of apertures and the edge region includes a flange. The header plate is connected to the coolant jacket via first and second contact areas between the header plate and the coolant jacket. The flange is outboard of the coolant jacket. The first contact area is between the flange and the coolant jacket and the second contact area is inboard of the first contact area. The coolant jacket includes a first end received by the header plate. The first end defines an external chamfer.

A tube type heat exchanger includes a core, a header plate, and a coolant jacket. The core includes multiple tubes. The header plate an array of apertures in which said tubes are received. The coolant jacket is arranged about said core. The header plate includes a body defining a central region and an edge region circumferential to said central region. The central region defines said array of apertures. The edge region includes a flange, a transition portion between the flange and the central region, and a free end. The central region extends substantially in a first plane, and the flange is substantially orthogonal to said first plane. The transition portion defines an external curve.

A method of producing a tube type heat exchanger includes the steps of: a) providing a header plate including a flange; b) fitting a coolant jacket about a core including a plurality of tubes; c) inserting the core and the coolant jacket into the header plate such that the flange extends external to the coolant jacket; and d) creating first and second braze joints between the edge region and the coolant jacket.

A method of producing a tube type heat exchanger includes the steps of: a) providing a header plate including a peripheral header plate flange; b) fitting a coolant jacket about a core of tubes; c) inserting the core and coolant jacket into the header plate such that the header plate flange retains the core and the coolant jacket on all sides; and d) forming a braze joint between the header plate and the coolant jacket.

DETAILED DESCRIPTION

Figure 1:
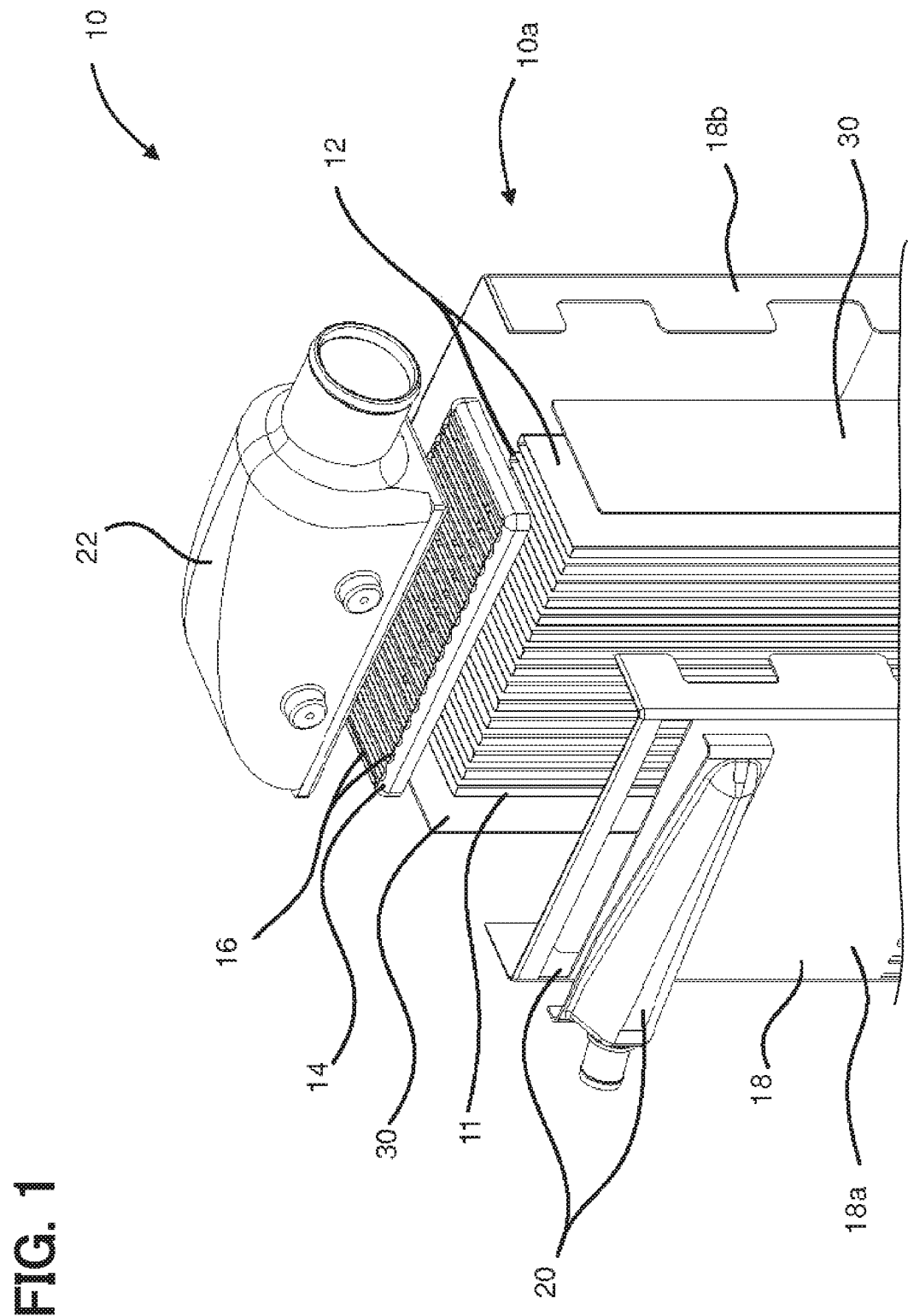
FIG. 1 is an exploded view of a heat exchanger according to a first embodiment.

To begin with, examples of relevant techniques will be described.

It is known to use a tube type heat exchanger to cool a fluid stream using a liquid, where the fluid stream to be cooled (such as charge air) flows inside tubes, and the liquid coolant flows outside the tubes. The liquid coolant is contained within a coolant jacket.

It is important to ensure that no leaks occur either between the two fluid circuits or externally from either circuit. A good seal is required between the coolant jacket and the remainder of the heat exchanger, without compromising the internal joints that provide the fluid circuits.

A standard tube type heat exchanger has a header plate through which the tubes extend such that the tubes are supported in an array. It is known to use the header plate as a means of securing the coolant jacket to the heat exchanger, by brazing the coolant jacket to the header plate. The header plate can also be used to locate the inlet or outlet tank for the fluid to be cooled. However, known header plates can be complex in design in order to provide the required seal between the header plate and the coolant jacket as well as location features for the inlet or outlet tank, leading to complex and expensive production.

An air cavity between the header plate and the coolant jacket may remain after assembly of the heat exchanger. Leakage from the air cavity may lead to a need for sealing with a weld after brazing of the primary joints between the header plate and the coolant jacket. Such leakage can be due to a lack of core compression during assembly, or errors in manufacturing tolerance.

Assembly of a tube type heat exchanger can be complicated and time consuming. It can be difficult to locate the parts with relation to one another, and to ensure that they remain in place whilst joints are formed, e.g. by brazing.

The present invention seeks to overcome or at least mitigate the problems of the prior art.

A tube type heat exchanger includes a core, a header plate, and a coolant jacket. The core includes multiple tubes. The header plate defines an array of apertures in which said tubes are received. The coolant jacket is arranged about said core. The header plate includes a body defining a central region and an edge region circumferential to said central region. The central region defines said array of apertures and The edge region includes a flange. The header plate is connected to the coolant jacket via first and second contact areas between the header plate and the coolant jacket.

In exemplary embodiments, the flange is outboard of the coolant jacket.

In exemplary embodiments, the first contact area is between the flange and the coolant jacket.

In exemplary embodiments, the second contact area is inboard of the first contact area.

Advantageously, the provision of two contact areas between the header plate and the coolant jacket allows robust sealing to be created between the two components, preventing leakage from the coolant circuit.

In exemplary embodiments, the coolant jacket comprises a first end received by the header plate and including an end face. The second contact area connects the end face and the header plate.

The end face of the coolant jacket extending to the interior of the header plate improves sealing between the two components and reduces the air gap between them.

In exemplary embodiments, the edge region includes a transition portion between the flange and the central region of the header plate. In exemplary embodiments, the transition portion defines a first internal face.

In exemplary embodiments, the second contact area connects the end face and the first internal face.

In exemplary embodiments, the first internal face comprises a planar surface.

The end face abutting a planar surface improves sealing between the coolant jacket and the header plate at the second contact area and simplifies joint creation.

In exemplary embodiments, the first contact area connects a flange internal face and an external face of the coolant jacket.

The first contact area connecting the flange and the coolant jacket further secures the header plate and the coolant jacket, and allows the header plate to act to retain the coolant jacket.

In exemplary embodiments, the first internal face and the flange internal face are substantially orthogonal to one another.

This arrangement of the internal faces of the edge region, and thus the arrangement of the first and second contact areas with respect to one another, allows a robust bond to be formed between the header plate and the coolant jacket and improves sealing.

In exemplary embodiments, the transition portion comprises an external curve.

The edge region being curved at the transition portion simplifies manufacture of the header plate and allows an inlet or outlet tank to be attached to the header plate.

In exemplary embodiments, the heat exchanger further includes braze joints at the first and second contact areas.

In exemplary embodiments, the coolant jacket includes a first end received by the header plate. In exemplary embodiments, said first end defines an external chamfer.

The chamfer at the first end of the coolant jacket aids fitting of the header plate over the coolant jacket.

In exemplary embodiments, the heat exchanger further includes a turbulator and a side plate adjacent the turbulator. The side plate is located by the header plate between the core and the coolant jacket.

The turbulator increases turbulence of flow of the coolant through the heat exchanger to improve performance.

In exemplary embodiments, the header plate defines a step or shoulder configured to be abutted by an end portion of the side plate.

In exemplary embodiments, the header plate defines a channel configured to receive an end portion of the side plate.

The header plate shoulder or channel locates the side plate with relation to the remainder of the heat exchanger and additionally provides an area where a bond can be formed between the header plate and the side plate (thereby improving sealing performance).

In exemplary embodiments, the header plate defines a slot adjacent the flange at at least one corner. In exemplary embodiments, the coolant jacket defines at least one tab. In exemplary embodiments, the or each slot is configured to receive a tab.

The slot or slots ease location of the header plate in relation to the coolant jacket, and give an indication of correct location of the header plate in relation to the coolant jacket.

The tab of the coolant jacket serves to seal any air cavity between the end of the coolant jacket and the header plate at the point where the header plate flange meets the remainder of the header plate.

In exemplary embodiments, the or each slot is curved inwardly towards the interior of the central region.

A curved slot or slots further improves location of the header plate.

In exemplary embodiments, the coolant jacket comprises a first end received by the header plate. In exemplary embodiments, the first end comprises an arm having a free end configured to abut an inner face of the header plate.

In exemplary embodiments, the arm is flexible. The flexibility of the arm allows full core compression to be achieved.

In exemplary embodiments, the free end comprises a protrusion configured to abut an inner face of the header plate.

The protrusion itself fills the air cavity between the header plate and the coolant jacket, whilst the flexibility of the arm allows further compression to occur.

In exemplary embodiments, the heat exchanger further comprises a charge air inlet or outlet tank mounted on the header plate. In exemplary embodiments, the tank comprises an edge that extends adjacent to and outboard of the flange.

Advantageously, the location of the charge air tank to the header plate flange being provided by the extension of an edge of the tank outside the flange allows the header plate to be simply manufactured whilst providing a robust bond. That is, no additional location features are provided by the header plate for the inlet or outlet tank, thus simplifying design of the header plate.

In exemplary embodiments, the heat exchanger further comprises a bonded connection between the tank edge and the flange, preferably wherein the bonded connection is a weld.

In exemplary embodiments, the tank edge comprises an external chamfer at the bonded connection.

The external chamfer at the tank edge provides a weld region.

In exemplary embodiments, the heat exchanger further comprises a charge air inlet or outlet tank mounted on the header plate. In exemplary embodiments, the tank comprises a tank edge that meets the header plate at an external corner of the flange.

In exemplary embodiments, the heat exchanger further comprises a bonded connection between the tank edge and the flange. In exemplary embodiments, the bonded connection is a weld.

In exemplary embodiments, the tank edge comprises an internal chamfer at the bonded connection.

The internal chamfer allows the tank edge to follow the shape of the external corner of the flange.

In exemplary embodiments, the tank edge comprises an external chamfer at the bonded connection.

The external chamfer at the tank edge provides a weld region.

There is also provided a tube type heat exchanger including a core, a header plate, and a coolant jacket. The core includes multiple tubes. The header plate defines an array of apertures in which said tubes are received. The coolant jacket is arranged about said core. The header plate includes a body defining a central region and an edge region circumferential to said central region. The central region defines said array of apertures. The edge region includes a flange, a transition portion between the flange and the central region, and a free end. The central region extends substantially in a first plane, and the flange is substantially orthogonal to said first plane. The transition portion defines an external curve.

The edge region of the heat exchanger is thus advantageously simple to manufacture, and allows an inlet or outlet tank to be attached to the header plate.

In exemplary embodiments, the transition portion defines a first internal face, and the first internal face comprises a planar surface.

The planar internal surface of the transition portion provides a suitable contact area for a joint to be formed.

In exemplary embodiments, the heat exchanger further comprises a coolant turbulator and a side plate adjacent the turbulator, wherein the side plate is located by the header plate between the core and the coolant jacket.

The turbulator increases turbulence of flow of the coolant through the heat exchanger to improve performance.

In exemplary embodiments, the transition portion defines an internal shoulder configured to be abutted by an end portion of the side plate.

The header plate shoulder locates the side plate with relation to the remainder of the heat exchanger and provides an area where a bond can be formed between the header plate and the side plate.

In exemplary embodiments, the heat exchanger further comprises a charge air inlet or outlet tank mounted on the header plate. In exemplary embodiments, the tank comprises a tank edge that extends adjacent to and outboard of the flange.

Advantageously, the location of the charge air tank to the header plate flange being provided by the extension of an edge of the tank outside the flange allows the header plate to be simply manufactured whilst providing a robust bond. That is, no additional location features are provided by the header plate for the inlet or outlet tank, thus simplifying design of the header plate.

In exemplary embodiments, the heat exchanger further comprises a bonded connection between the tank edge and the flange. In exemplary embodiments, the bonded connection may be a weld.

In exemplary embodiments, the tank edge comprises an external chamfer at the bonded connection.

The external chamfer at the tank edge provides a weld region.

In exemplary embodiments, the heat exchanger further comprises a charge air inlet or outlet tank mounted on the header plate. In exemplary embodiments, the tank comprises a tank edge that meets the header plate at an external corner of the flange.

In exemplary embodiments, the heat exchanger further comprise a bonded connection between the tank edge and the flange. In exemplary embodiments, the bonded connection is a weld.

In exemplary embodiments, the tank edge comprises an internal chamfer at the bonded connection.

In exemplary embodiments, the tank edge comprises an external chamfer at the bonded connection.

There is further provided a method of producing a tube type heat exchanger as set out above. The method includes the steps of: a) providing a header plate comprising a flange; b) fitting a coolant jacket about a core comprising a plurality of tubes; c) inserting the core and the coolant jacket into the header plate such that the flange extends external to the coolant jacket; and d) creating first and second braze joints between the edge region and the coolant jacket.

There is yet further provided a method of producing a tube type heat exchanger. The method includes the steps of: a) providing a header plate comprising a peripheral header plate flange; b) fitting a coolant jacket about a core of tubes; c) inserting the core and coolant jacket into the header plate such that the header plate flange retains the core and the coolant jacket on all sides; and d) forming a braze joint between the header plate and the coolant jacket.

In exemplary embodiments, the tube type heat exchanger includes a core, a header plate, and a coolant jacket. The core includes multiple tubes. The header plate defines an array of apertures in which said tubes are received. The coolant jacket is arranged about said core. The header plate includes a body defining a central region and an edge region circumferential to said central region. The central region defines said array of apertures. The edge region includes a flange.

In exemplary embodiments; the header plate is connected to the coolant jacket via first and second contact areas between the header plate and the coolant jacket.

In exemplary embodiments, the flange is outboard of the coolant jacket.

In exemplary embodiments, the first contact area is between the flange and the coolant jacket.

In exemplary embodiments, the second contact area is inboard of the first contact area.

Advantageously, the provision of two contact areas between the header plate and the coolant jacket allows robust sealing to be created between the two components, preventing leakage from the coolant circuit.

In exemplary embodiments, the coolant jacket comprises a first end received by the header plate and including an end face. The second contact area connects the end face and the header plate.

The end face of the coolant jacket extending to the interior of the header plate improves sealing between the two components and reduces the air gap between them.

In exemplary embodiments, the edge region includes a transition portion between the flange and the central region of the header plate. In exemplary embodiments, the transition portion defines a first internal face.

In exemplary embodiments, the second contact area connects the end face and the first internal face.

In exemplary embodiments, the first internal face comprises a planar surface.

The end face abutting a planar surface improves sealing between the coolant jacket and the header plate at the second contact area and simplifies joint creation.

In exemplary embodiments, the first contact area connect a flange internal face and an external face of the coolant jacket.

The first contact area connecting the flange and the coolant jacket further secures the header plate and the coolant jacket, and allows the header plate to act to retain the coolant jacket.

In exemplary embodiments, the first internal face and the flange internal face are substantially orthogonal to one another.

This arrangement of the internal faces of the edge region, and thus the arrangement of the first and second contact areas with respect to one another, allows a robust bond to be formed between the header plate and the coolant jacket and improves sealing.

In exemplary embodiments, the transition portion may comprise an external curve.

The edge region being curved at the transition portion simplifies manufacture of the header plate and allows an inlet or outlet tank to be attached to the header plate.

In exemplary embodiments, the heat exchanger further comprises braze joints at the first and second contact areas.

In exemplary embodiments, the coolant jacket comprises a first end received by the header plate. In exemplary embodiments, said first end defines an external chamfer.

The chamfer at the first end of the coolant jacket aids fitting of the header plate over the coolant jacket.

In exemplary embodiments, the heat exchanger further comprises a turbulator and a side plate adjacent the turbulator, wherein the side plate is located by the header plate between the core and the coolant jacket.

The turbulator increases turbulence of flow of the coolant through the heat exchanger to improve performance.

In exemplary embodiments, the header plate defines a step or shoulder configured to be abutted by an end portion of the side plate.

In exemplary embodiments, the header plate defines a channel configured to receive an end portion of the side plate.

The header plate shoulder or channel locates the side plate with relation to the remainder of the heat exchanger and additionally provides an area where a bond can be formed between the header plate and the side plate (thereby improving sealing performance).

In exemplary embodiments, the header plate defines a slot adjacent the flange at at least one corner. In exemplary embodiments, the coolant jacket may define at least one tab.

In exemplary embodiments, the or each slot may be configured to receive a tab.

The slot or slots ease location of the header plate in relation to the coolant jacket, and give an indication of correct location of the header plate in relation to the coolant jacket.

The tab of the coolant jacket serves to seal any air cavity between the end of the coolant jacket and the header plate at the point where the header plate flange meets the remainder of the header plate.

In exemplary embodiments, the or each slot may be curved inwardly towards the interior of the central region.

A curved slot or slots further improves location of the header plate.

In exemplary embodiments, the coolant jacket comprises a first end received by the header plate. In exemplary embodiments, the first end comprises an arm having a free end configured to abut an inner face of the header plate.

In exemplary embodiments, the arm is flexible. The flexibility of the arm allows full core compression to be achieved.

In exemplary embodiments, the free end comprises a protrusion configured to abut an inner face of the header plate.

The protrusion itself fills the air cavity between the header plate and the coolant jacket, whilst the flexibility of the arm allows further compression to occur.

In exemplary embodiments, the heat exchanger further comprises a charge air inlet or outlet tank mounted on the header plate. In exemplary embodiments, the tank comprises a tank edge that extends adjacent to and outboard of the flange.

Advantageously, the location of the charge air tank to the header plate flange being provided by the extension of an edge of the tank outside the flange allows the header plate to be simply manufactured whilst providing a robust bond. That is, no additional location features are provided by the header plate for the inlet or outlet tank, thus simplifying design of the header plate.

In exemplary embodiments, the heat exchanger further comprises a bonded connection between the tank edge and the flange, preferably wherein the bonded connection is a weld.

In exemplary embodiments, the tank edge comprises an external chamfer at the bonded connection.

The external chamfer at the tank edge provides a weld region.

In exemplary embodiments, the heat exchanger further comprises a charge air inlet or outlet tank mounted on the header plate. In exemplary embodiments, the tank comprises a tank edge that meets the header plate at an external corner of the flange.

In exemplary embodiments, the heat exchanger further comprises a bonded connection between the tank edge and the flange. In exemplary embodiments, the bonded connection is a weld.

In exemplary embodiments, the tank edge comprises an internal chamfer at the bonded connection.

The internal chamfer allows the tank edge to follow the shape of the external corner of the flange.

In exemplary embodiments, the tank edge comprises an external chamfer at the bonded connection.

The external chamfer at the tank edge provides a weld region.

In exemplary embodiments, the tube type heat exchanger includes a core, a header tank, and a coolant jacket. The core includes multiple tubes. The header plate defines an array of apertures in which said tubes are received. The coolant jacket is arranged about said core. The header plate includes a body defining a central region and an edge region circumferential to said central region. The central region defines said array of apertures. The edge region includes a flange, a transition portion between the flange and the central region, and a free end. The central region extends substantially in a first plane, and the flange is substantially orthogonal to said first plane. The transition portion defines an external curve.

The edge region of the heat exchanger is thus advantageously simple to manufacture, and allows an inlet or outlet tank to be attached to the header plate.

In exemplary embodiments, the transition portion defines a first internal face, and the first internal face comprises a planar surface.

The planar internal surface of the transition portion provides a suitable contact area for a joint to be formed.

In exemplary embodiments, the heat exchanger further includes a coolant turbulator and a side plate adjacent the turbulator. The side plate is located by the header plate between the core and the coolant jacket.

The turbulator increases turbulence of flow of the coolant through the heat exchanger to improve performance.

In exemplary embodiments, the transition portion defines an internal shoulder configured to be abutted by an end portion of the side plate.

The header plate shoulder locates the side plate with relation to the remainder of the heat exchanger and provides an area where a bond can be formed between the header plate and the side plate.

In exemplary embodiments, the heat exchanger further comprises a charge air inlet or outlet tank mounted on the header plate. In exemplary embodiments, the tank comprises a tank edge that extends adjacent to and outboard of the flange.

Advantageously, the location of the charge air tank to the header plate flange being provided by the extension of an edge of the tank outside the flange allows the header plate to be simply manufactured whilst providing a robust bond. That is, no additional location features are provided by the header plate for the inlet or outlet tank, thus simplifying design of the header plate.

In exemplary embodiments, the heat exchanger further comprises a bonded connection between the tank edge and the flange. In exemplary embodiments, the bonded connection is a weld.

In exemplary embodiments, the tank edge comprises an external chamfer at the bonded connection.

The external chamfer at the tank edge provides a weld region.

In exemplary embodiments, the heat exchanger further comprises a charge air inlet or outlet tank mounted on the header plate. In exemplary embodiments, the tank comprises a tank edge that meets the header plate at an external corner of the flange.

In exemplary embodiments, the heat exchanger further comprises a bonded connection between the tank edge and the flange. In exemplary embodiments, the bonded connection is a weld.

In exemplary embodiments, the tank edge comprises an internal chamfer at the bonded connection.

In exemplary embodiments, the tank edge comprises an external chamfer at the bonded connection.

With reference to FIG. 1, a tube type heat exchanger is indicated generally at 10. The heat exchanger 10 of this embodiment is configured for cooling a fluid stream (such as charge air) using a liquid coolant.

Figure 3:
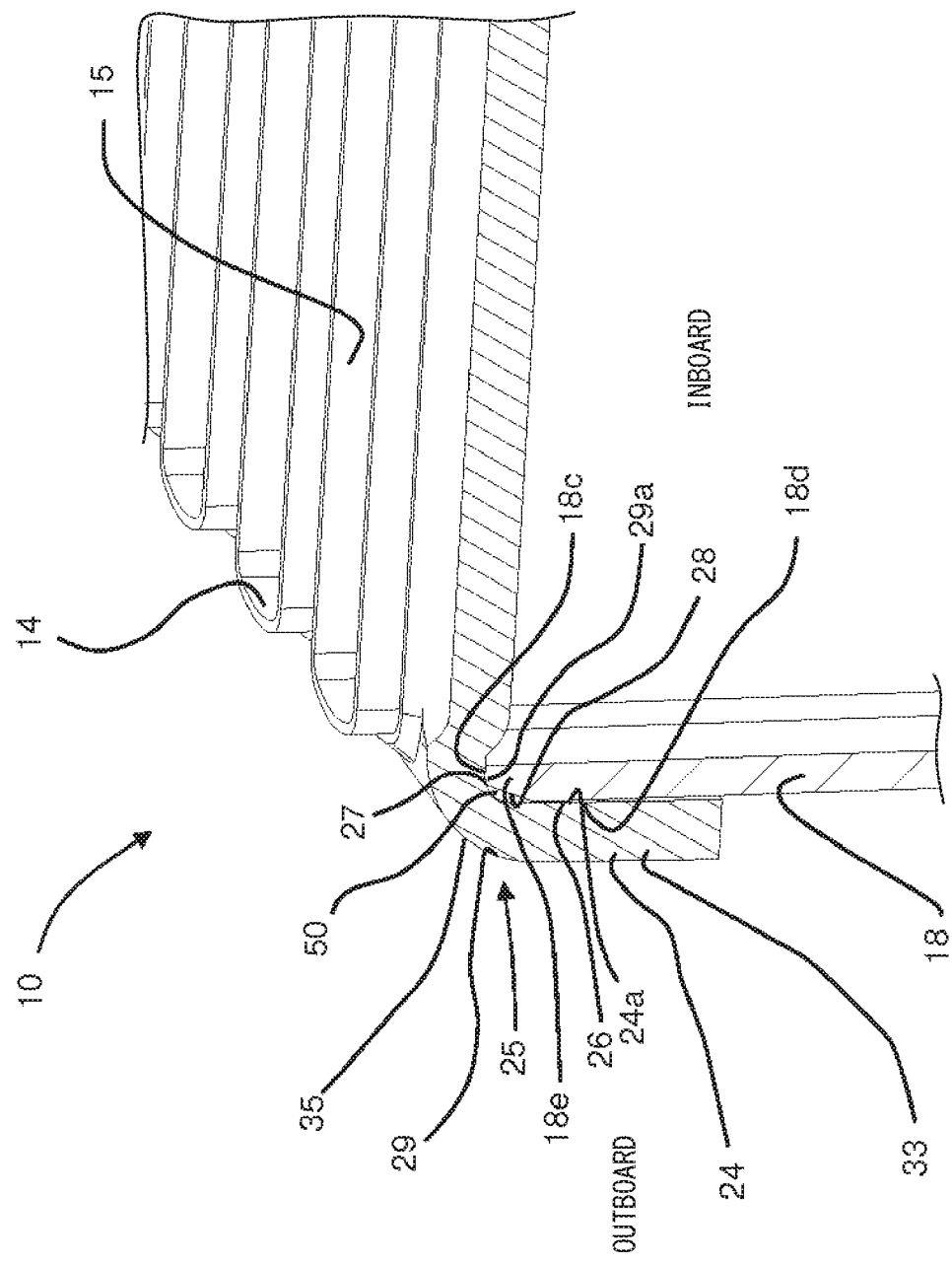
FIG. 3 is a partial cross-sectional view through the heat exchanger of FIG. 1.

The terms inboard and outboard are used in reference to the heat exchanger throughout the description to indicate the relative location of relevant features, and are indicated in FIG. 3 at INBOARD and OUTBOARD. Inboard is used to indicate features further towards the centre of the heat exchanger than outboard features.

The heat exchanger 10 has a core 11 of tubes 12 through which flow the fluid to be cooled. The tubes 12 are substantially rectangular in cross section and are arranged parallel to one another. The tubes 12 are spaced from one another to allow coolant to flow between the tubes 12. The tubes 12 have inner fins (not shown) to promote cooling.

A header plate 14 locates the tubes 12 in relation to one another. The header plate 14 defines an array of parallel, substantially rectangular apertures 16 corresponding in shape and size to the tubes 12. The tubes 12 are held in place in relation to one another by the apertures 16.

The heat exchanger 10 has a coolant jacket 18 arranged about the core 11 and through which coolant flows. The coolant jacket 18 serves to contain the coolant and prevent leakage from the coolant circuit. The coolant jacket 18 has an inlet coolant channel 20 and an outlet coolant channel (not shown) to allow coolant to be circulated through the coolant jacket 18.

In this embodiment, the coolant jacket 18 is made up of two parts 18a, 18b that fit together about the core 11. In alternative embodiments, the coolant jacket is made up of 3 or more parts intended to be fitted together about the core. However, in other embodiments, the coolant jacket may be a single piece unit configured to be fitted around the core.

The heat exchanger 10 has an inlet tank 22 through which fluid to be cooled enters the heat exchanger, and an outlet tank (not shown) where the cooled fluid leaves the heat exchanger 10. The inlet tank 22 is attached to the header plate 14 such that fluid to be cooled passes through from the inlet tank 22 through the tubes 12 to the outlet tank. As the fluid to be cooled passes through the tubes 12, it is cooled by the coolant flowing within the coolant jacket 18 from the inlet coolant channel 20 to the outlet coolant channel.

FIG. 1 shows only a first end 10a of the heat exchanger 10. A second end of the heat exchanger (not shown) has an identical or similar header plate 14. The outlet tank is attached to the second header plate in the same way that the inlet tank 22 is attached to the depicted header plate 14.

Figure 2:
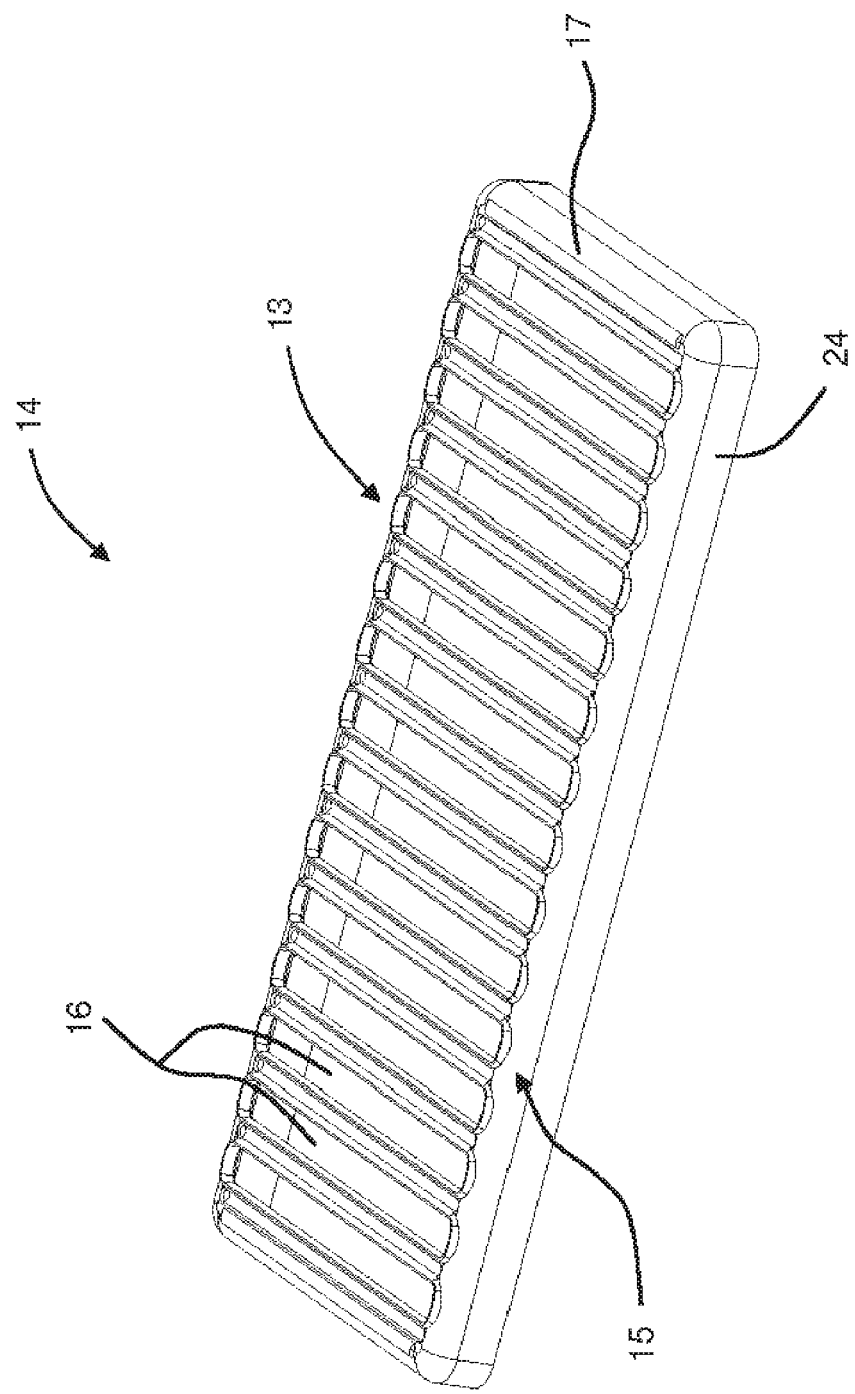
FIG. 2 is an isometric view of the header plate of the heat exchanger of FIG. 1.

As shown in FIG. 2, the header plate 14 has a body 13 having a central region 15 and an edge region 17. The edge region 17 is circumferential to the central region 15. The central region 15 defines the array of apertures 16. The edge region 17 has a flange 24 configured to locate the header plate 14 in relation to the coolant jacket 18. The flange 24 is outboard of the coolant jacket 18.

With reference now to FIG. 3, the heat exchanger 10 has a first contact area 26 and a second contact area 27 between the header plate 14 and the coolant jacket 18. The first contact area 26 is between the flange 24 and the coolant jacket 18. The second contact area 27 is inboard of the first contact area 26. The first 26 and second 27 contact areas are located proximal one another in a sealing region 25 between the circumferential edge region 17 and the coolant jacket 18.

The first and second contact areas 26, 27 provide suitable areas for the formation of braze joints. Contact between the header plate 14 and the coolant jacket 18 at the contact areas 26, 27 ensures that the parts seal together on brazing.

The coolant jacket of this embodiment has a first end 18e received by the header plate 14. The first end 18e has a leading end face 18c. The leading end face 18c abuts the header plate 14 at the second contact area 27, so that the second contact area 27 connects the leading end face 18c and the header plate 14. The first and second contact areas 26, 27 are both at the first end 18e of the coolant jacket 18. The first and second contact areas 26, 27 are in this embodiment substantially parallel to one another, i.e. both of the first and second contact areas 26, 27 extend around the coolant jacket 18 substantially parallel to one another.

The edge region 17 has a free end 33, in the form of a free end 33 of the flange 24, and a transition portion 29 between the flange 24 and the central region 15. The transition portion 29 has a first internal face 29a that forms part of the second contact area 27. The leading end face 18c abuts the first internal face 29a at the second contact area 27. In this embodiment, the first internal face 29a is planar. The planar nature of the first internal face 29a allows a suitable connection to be formed between the leading end face 18c and the first internal face 29a, so that a robust bond can be formed between the two.

The first contact area 26 is between an internal face 24a of the flange 24, at the free end 33, and an external face 18d of a wall of the coolant jacket 18. The central region 15 extends substantially in a first plane, and the free end 33 is substantially orthogonal to the first plane. The internal face 24a and the internal face 29a are therefore substantially orthogonal to one another. The first and second contact areas 26, 27 are therefore advantageously substantially orthogonal to one another. This arrangement of the first and second contact areas 26, 27 strengthens the bond between the header plate 14 and the coolant jacket 18.

The transition portion 29 defines an external curve 35 between the central region 15 and the flange 24. The external curve 35 aids attachment of the tank 22 to the header plate 14, as described in further detail below in relation to the sixth, seventh and eighth embodiments.

In this embodiment, the flange 24 extends about the full periphery of the header plate 14. This advantageously allows a connection to be formed between the header plate 14 and the coolant jacket 18 around the full periphery of the coolant jacket 18. In addition, the shape of the flange 24 (described in further detail below) and the arrangement of the flange 24 being outboard of the coolant jacket 18 advantageously allows the volume within the coolant jacket 18 to be maximized.

The first end 18e of the coolant jacket 18 has an external chamfer 28. The chamfer 28 improved ease of assembly of the heat exchanger 10, as the chamfer 28 enables the header plate 14 to fit over the coolant jacket 18 more easily.

Figure 4:
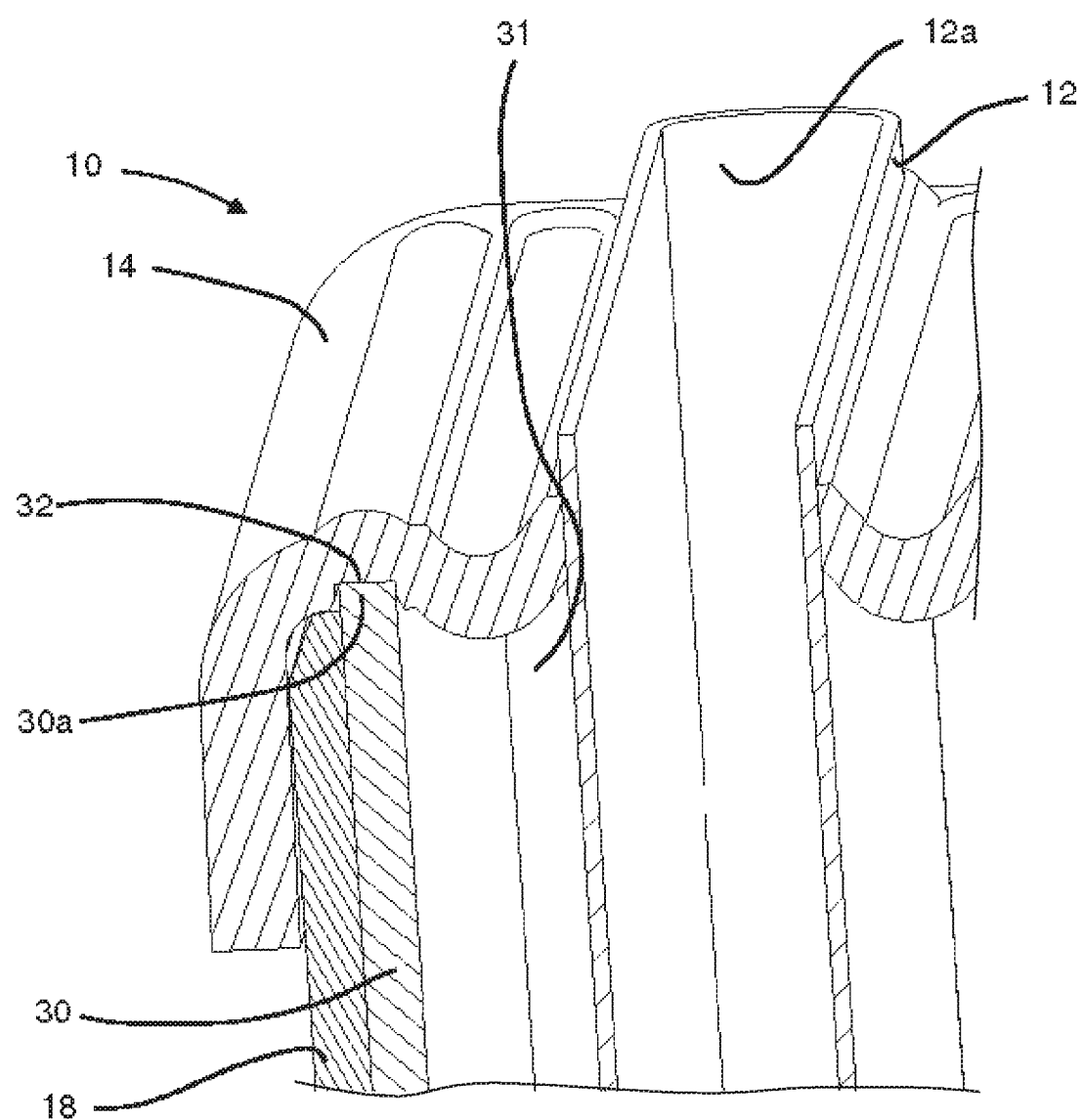
FIG. 4 is a further partial cross-sectional view through the heat exchanger of FIG. 1.

With reference now to FIG. 4, the heat exchanger 10 of this embodiment has a turbulator (not shown) at each opposing side of the core 11, for promoting heat transfer. Each turbulator is, in this embodiment, in the form of a fin. In alternative embodiments, some alternative suitable turbulator is provided. The heat exchanger 10 has a side plate 30 adjacent the turbulator, between each of the outermost tubes 12a and the coolant jacket 18. Each side plate 30 is spaced from the outermost tube 12a so as to leave a coolant channel 31 between the side plate 30 and each corresponding outermost tube 12a. The header plate 14 locates the side plates 30.

In this embodiment, a channel 32 is defined at each end of the header plate 14 and receives and locates each side plate 30. A first end 30a of each side plate 30 is received by the header plate 14 at the channel 32. A bond such as a braze joint is formed between the side plate 30 and the header plate 14 at the channel 32. The channel 32 locates the side plate 30 in relation to the header plate 14 prior to sealing, and provides additional sealing between the header plate 14 and the side plate 30 once a braze joint has been formed.

In this embodiment, the channel 32 is substantially U-shaped in cross-section. In alternative embodiments, the channel is of some other suitable cross-section.

During assembly, the coolant jacket 18 is fitted about the core 11 and the side plates 30. The core 11, the coolant jacket 18 and the side plates 30 are then inserted into the header plate 14, or the header plate 14 is fitted over the core 11, coolant jacket 18, and the side plates 30, such that the header plate flange 24 retains the core 11 and the coolant jacket 18 on all four sides. In this embodiment, the header plate flange 24 fully encircles the coolant jacket 18. Braze joints are then formed between the header plate 14 and the coolant jacket 18 at the first and second contact areas 26, 27, and between the side plate 30 and the header plate 14 at the channel 32. The tank 22 is then fitted over the header plate 14 and welded to the header plate 14, as described in further detail below in relation to the sixth, seventh and eighth embodiments.

Figure 5:
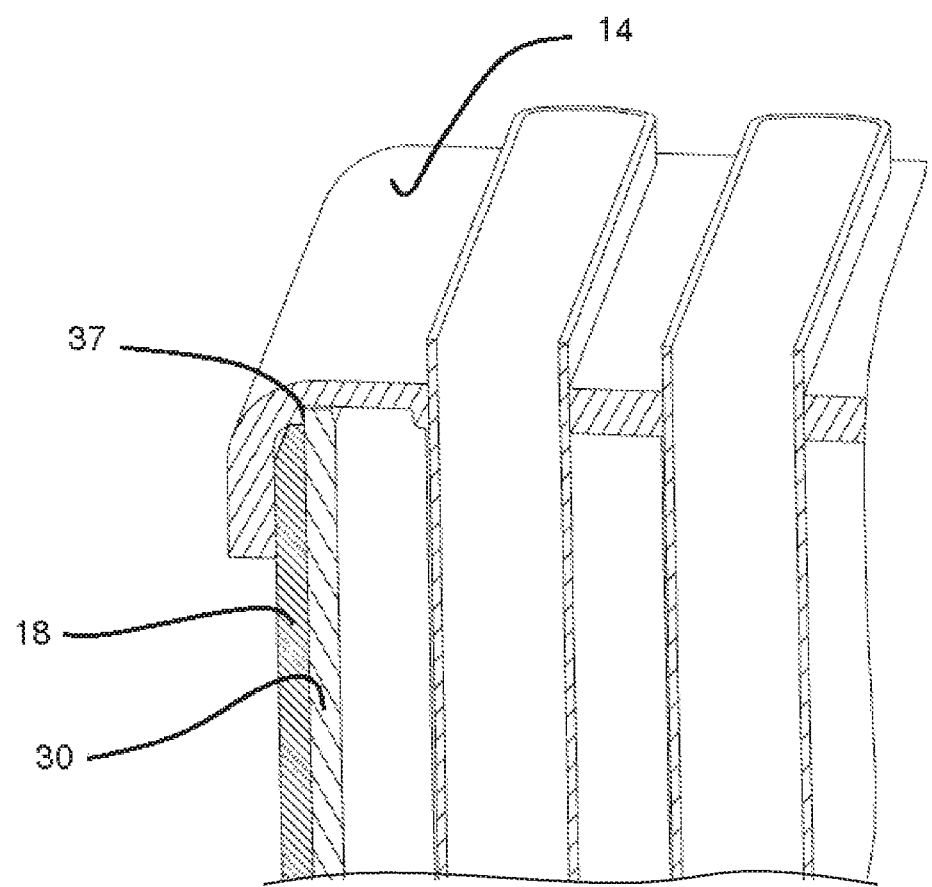
FIG. 5 is a partial cross-sectional view through the heat exchanger of FIG. 1 with an alternative header plate.

FIG. 5 shows an alternative embodiment where the header plate 14 defines a step or shoulder 37 configured to locate the side plate, rather than a channel. The side plate 30 is bonded to the shoulder 37 and to the header plate 14 with a braze joint. The step or shoulder 37 locates the side plate in relation to the header plate 14 prior to sealing, and provides additional sealing between the header plate 14 and the side plate 30 once a braze joint has been formed.

Figure 6:
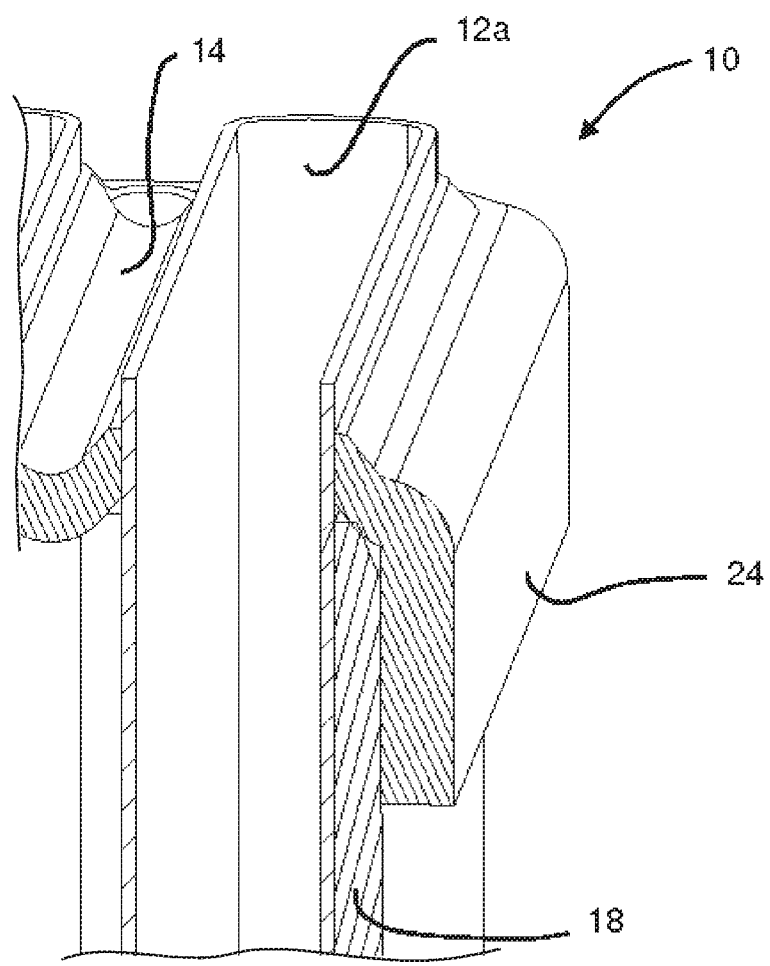
FIG. 6 is a partial cross-sectional view through a heat exchanger according to a second embodiment.

FIG. 6 shows a further embodiment, where no turbulator is provided between the end tube of the core and the coolant jacket 18. There is therefore no requirement for a side plate. The coolant jacket 18 is in contact with the outside tube 12a. No channel is provided in the header plate. The coolant jacket 18 is in contact with the header plate 14 as described in the previous embodiment.

A further embodiment is shown in FIGS. 7A, 7B, 8 and 9. Features corresponding to those of previous embodiments have been given corresponding reference numbers with the additional prefix "1", Only features that differ from those of the previous embodiment are discussed in more depth.

Figure 7A:
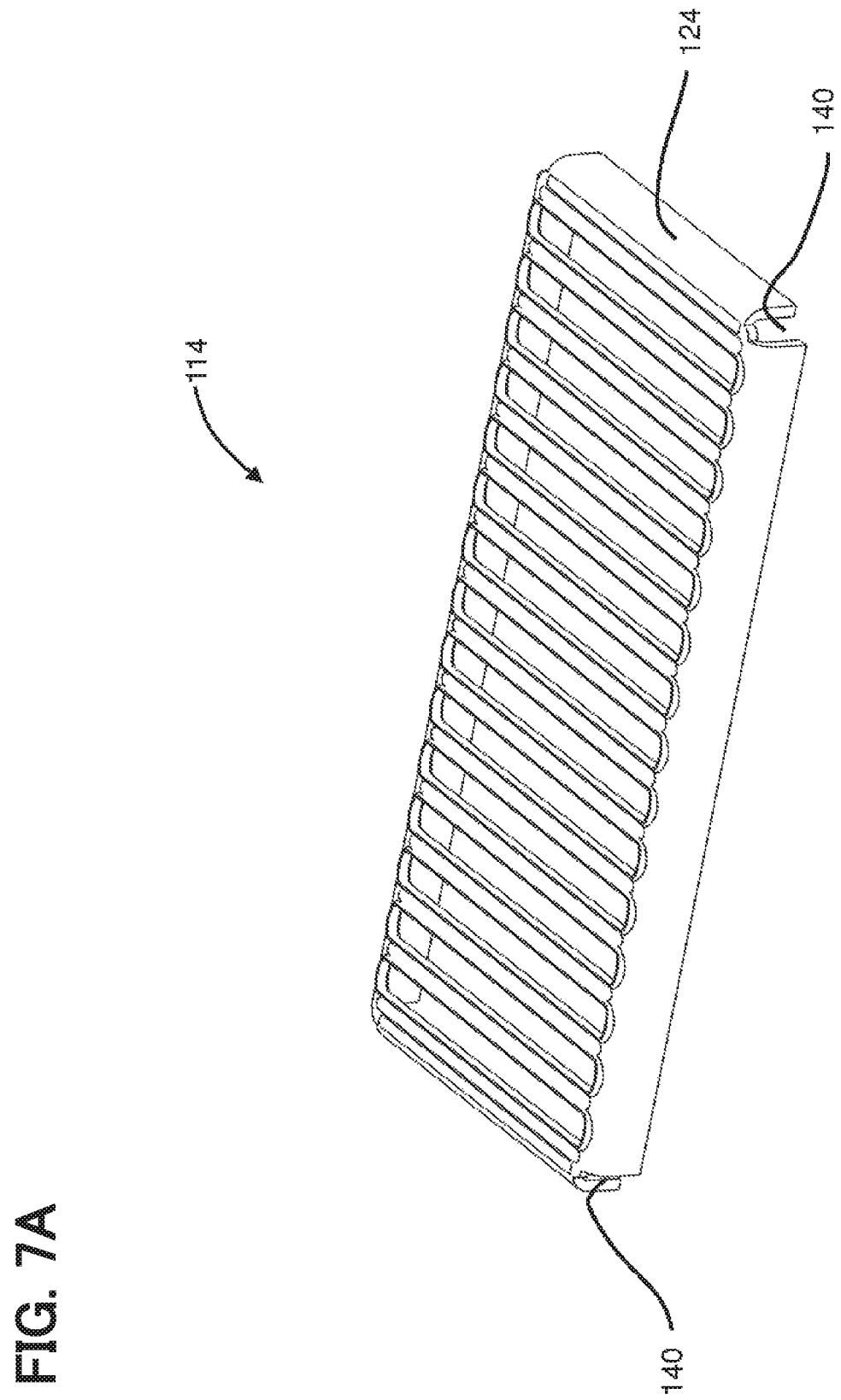
FIG. 7A is an isometric view of the header plate for a heat exchanger according to a third embodiment.
Figure 7B:
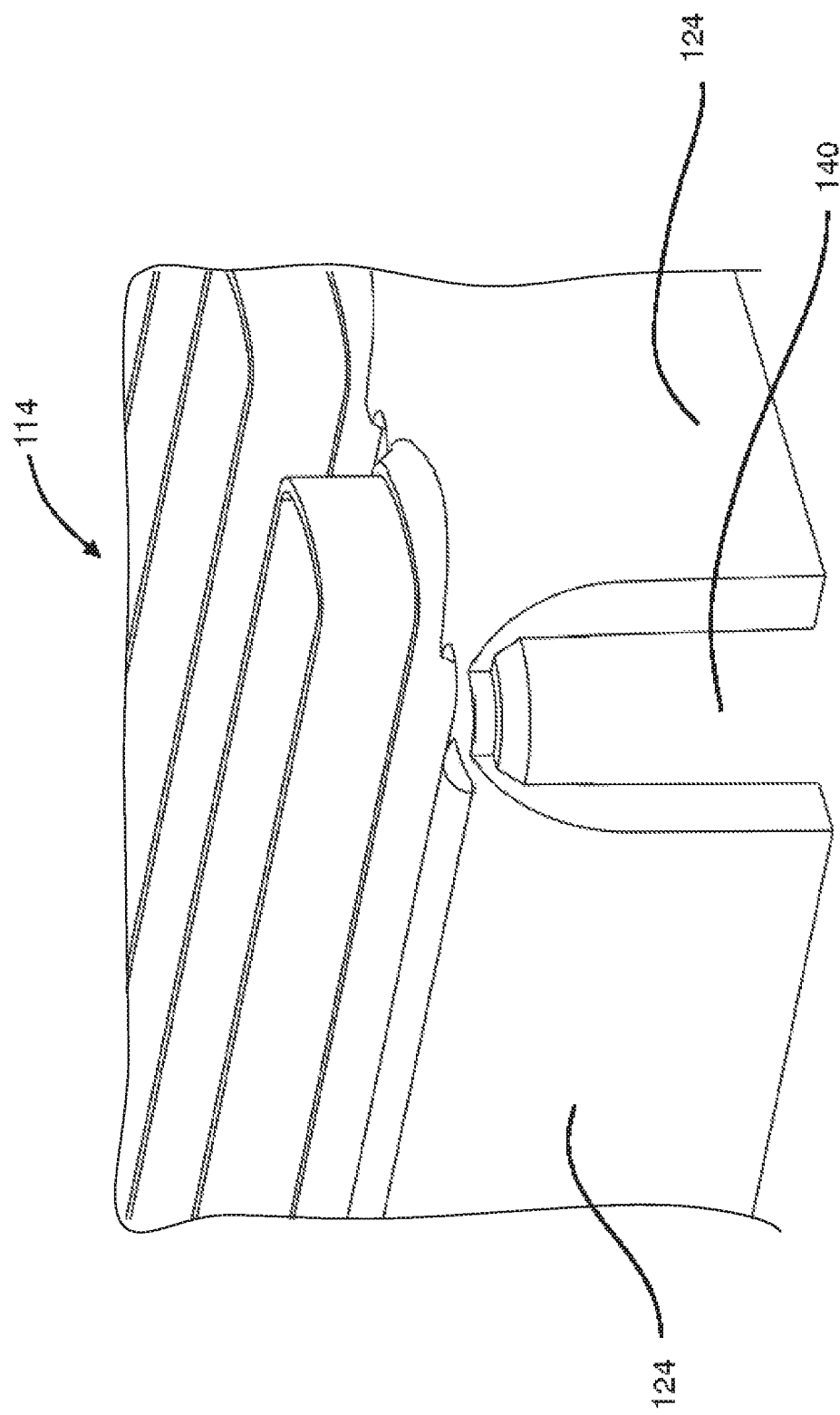
FIG. 7B is a partial view of the header plate of FIG. 7A.
Figure 8:
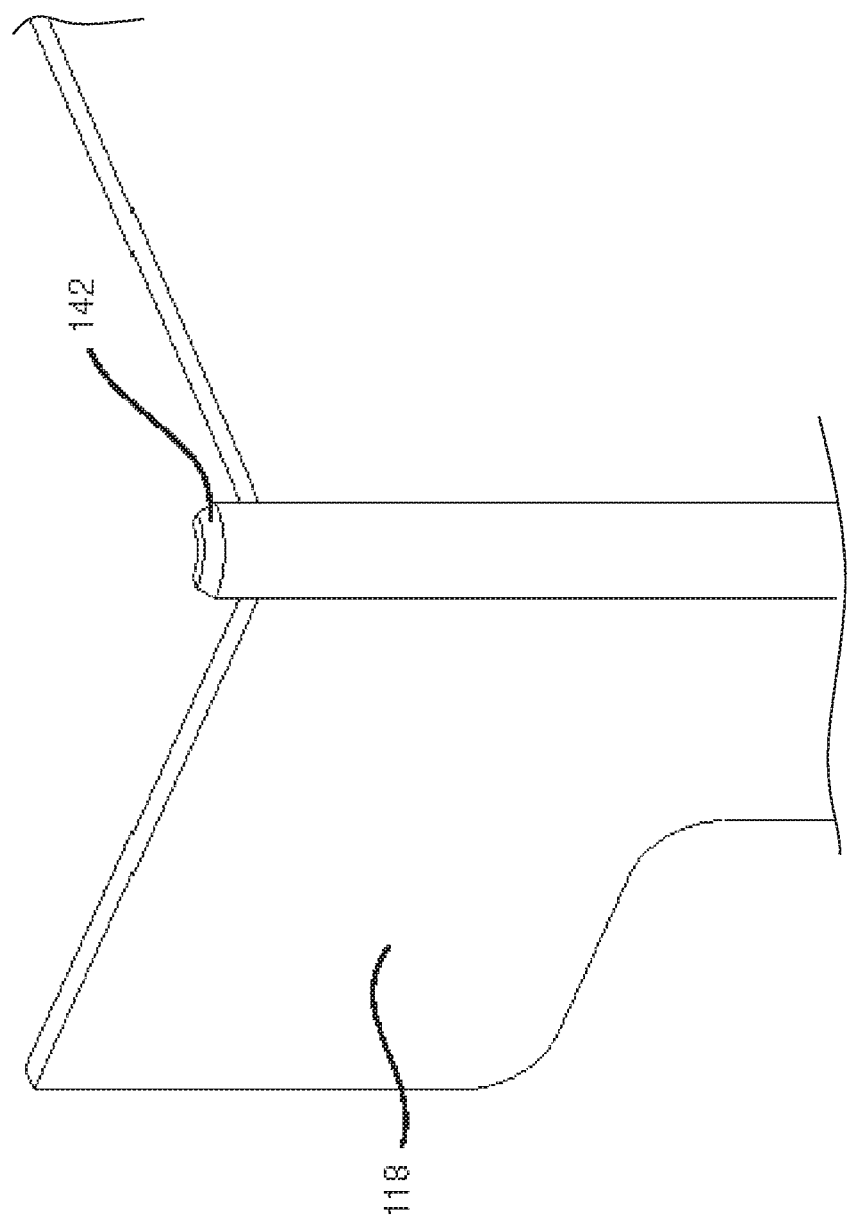
FIG. 8 is a partial view of the cooler jacket of the heat exchanger of FIGS. 7A and 7B.
Figure 9:
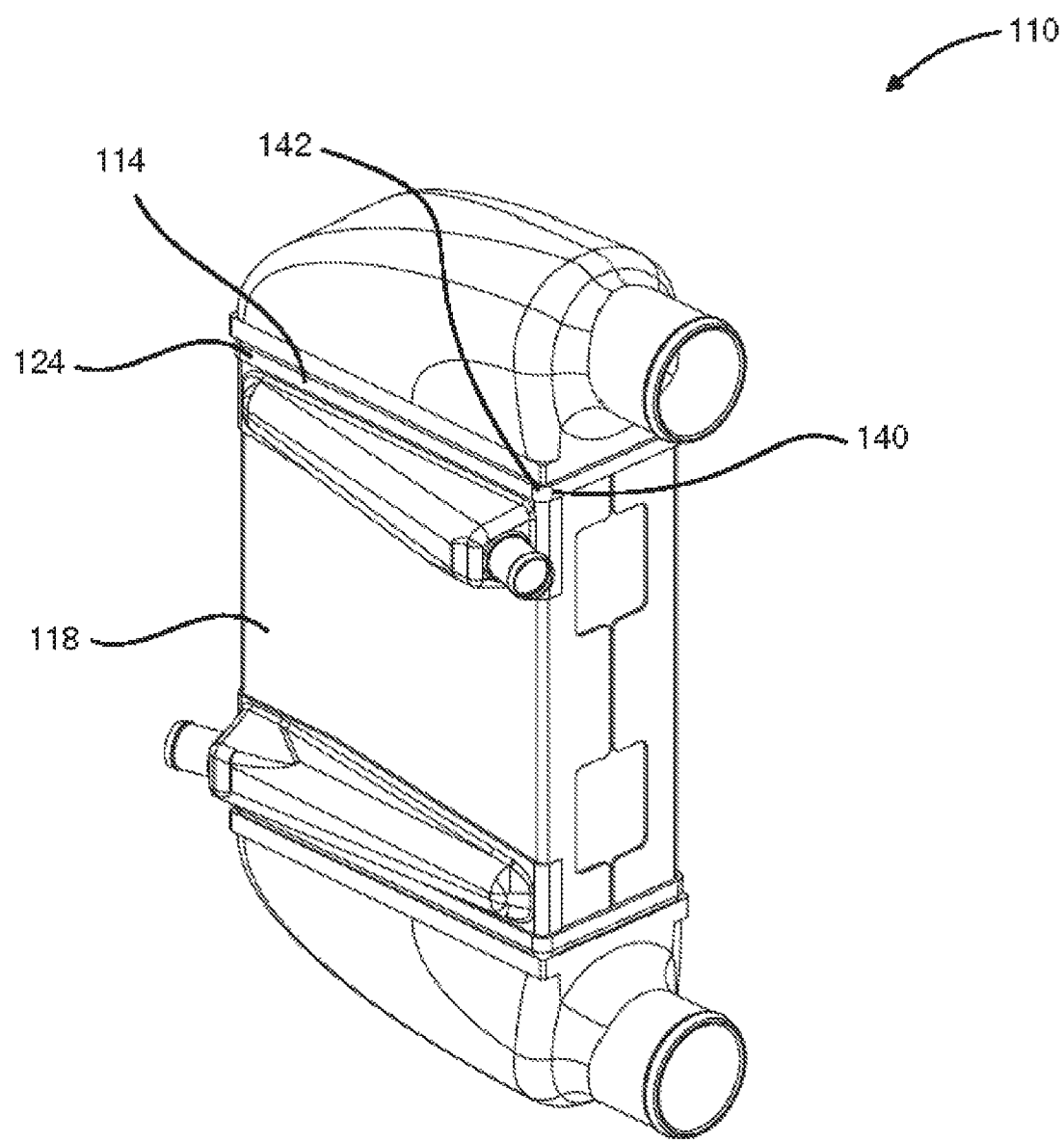
FIG. 9 is an isometric view of the heat exchanger of FIGS. 7A, 7B and 8.

The heat exchanger 110 of this embodiment differs to that of the previous embodiments only in the features of the header plate 114, as shown in detail in FIGS. 7A and 7B. In this embodiment, the header plate 114 has open corners 140. That is, an aperture or slot 140 is defined by the flange 124 at each corner of the header plate 114. Advantageously, manufacture of the header plate 114 is simplified, as no corners need to be formed.

In order to provide sealing about the full periphery of the coolant jacket 118 and avoid leakage from the system, the coolant jacket 118 of this embodiment has a tab 142 extending from each corner. Each tab 142 is shaped to fit the corresponding open corner 140 of the header plate 114, so that when the header plate 114 is fitted over the coolant jacket 118 and the core 111, the tab 142 fits the corresponding open corner 140. A braze joint is formed between the header plate 114 and the coolant jacket 118 at the tab 142. Advantageously, the tabs 142 on the coolant jacket 118 improve ease of location of the header plate 114 during assembly.

Figure 10:
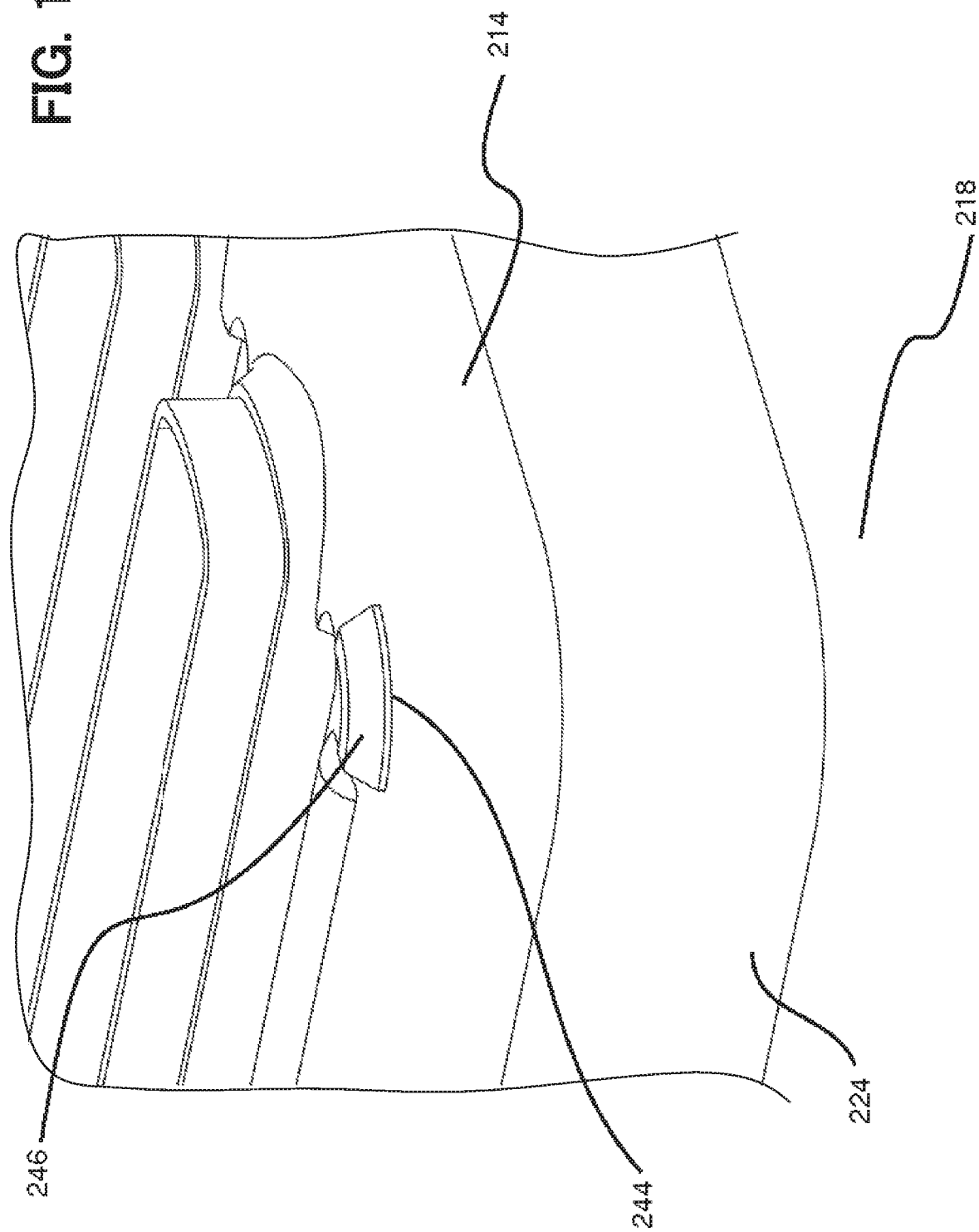
FIG. 10 is an enlarged partial view of a heat exchanger according to a fourth embodiment.

A further embodiment is shown in FIG. 10. Features corresponding to those of previous embodiments have been given corresponding reference numbers with the additional prefix "2". Only features that differ from those of the previous embodiment are discussed in more depth.

The header plate 214 of this embodiment is similar to that of the first embodiment, in that the peripheral flange 224 extends about the full periphery of the header plate 214. In this embodiment, however, the header plate 214 defines a slot 244 at each corner. Each slot 244 is proximal or adjacent to the flange 224.

The coolant jacket 218 of this embodiment defines at each corner a tab 246 configured to engage a corresponding slot 244. Each tab 246 is configured to fill the corresponding slot 244, so that a seal can be formed between the tab 246 and the slot 244, for example by brazing.

In this embodiment, each slot 244 is curved, having an arc that substantially follows the corresponding corner of the header plate 114. Each tab 246 is likewise curved, to correspond to the shape of the slots 244. The curved shape of the slots 244 aids location of the header plate 214 on fitting to the coolant jacket 218.

The slot 244 and tab 246 arrangement provides a mechanical lock between the header plate 214 and the coolant jacket 218, as well as providing proof of correct location of the header plate 214 on the coolant jacket 218. In addition, where there is an air gap between the coolant jacket 218 and the header plate 214, where the flange 224 meets the header plate 214 as indicated at 50 in FIG. 3, the tab 246 serves to seal the air gap 50.

Figure 11:
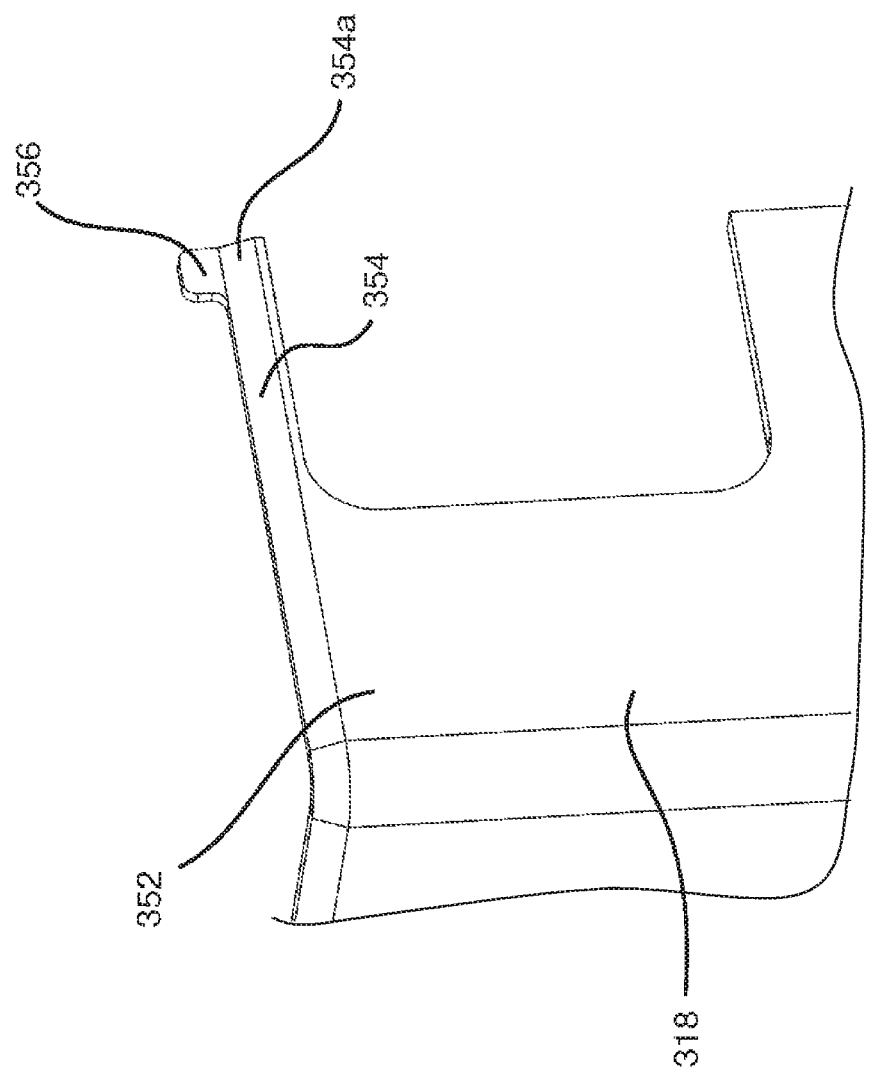
FIG. 11 is a partial isometric view of the coolant jacket of a heat exchanger according to a fifth embodiment.
Figure 12:
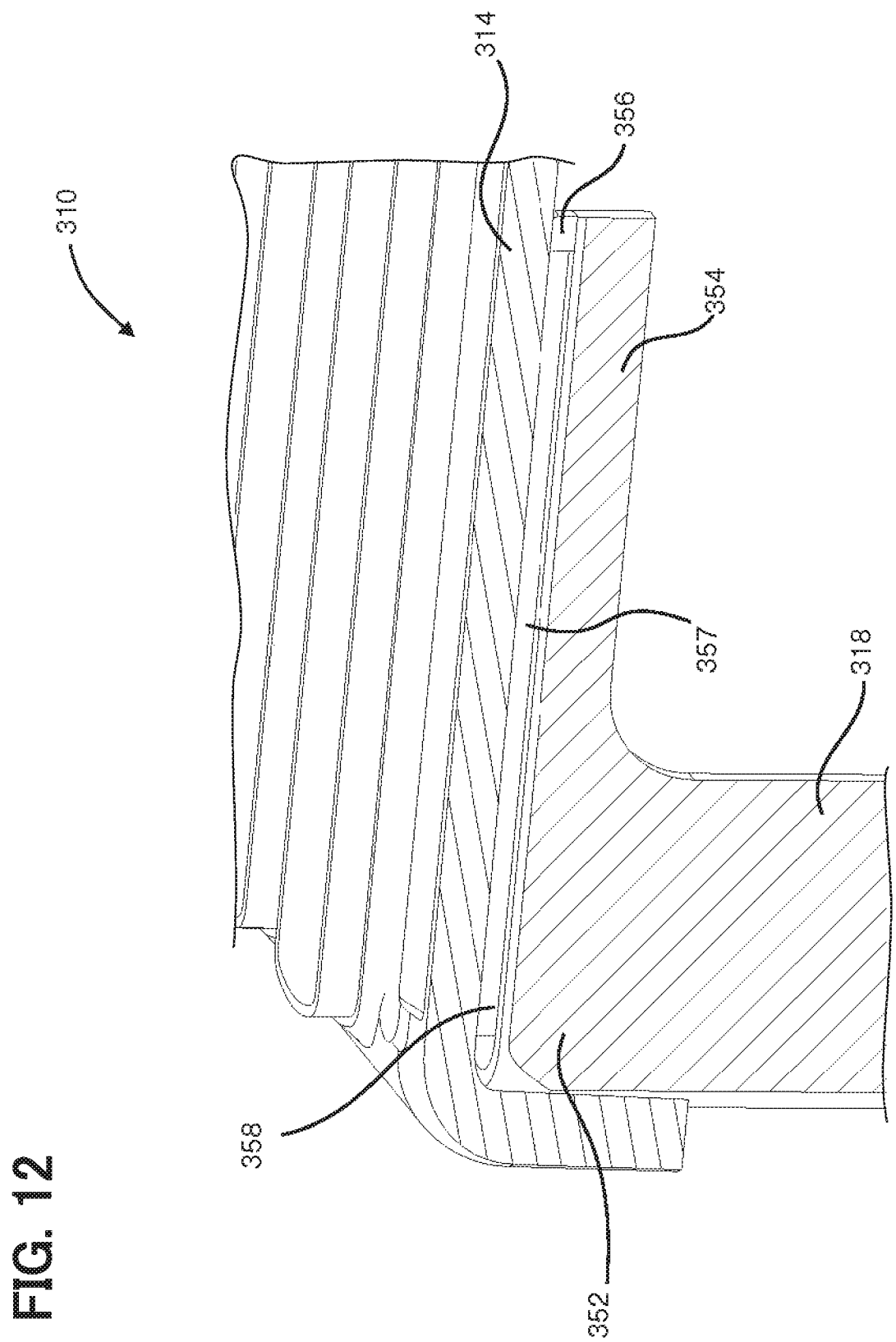
FIG. 12 is a cross-sectional view through the heat exchanger of FIG. 11 showing the coolant jacket arm in a first position.
Figure 13:
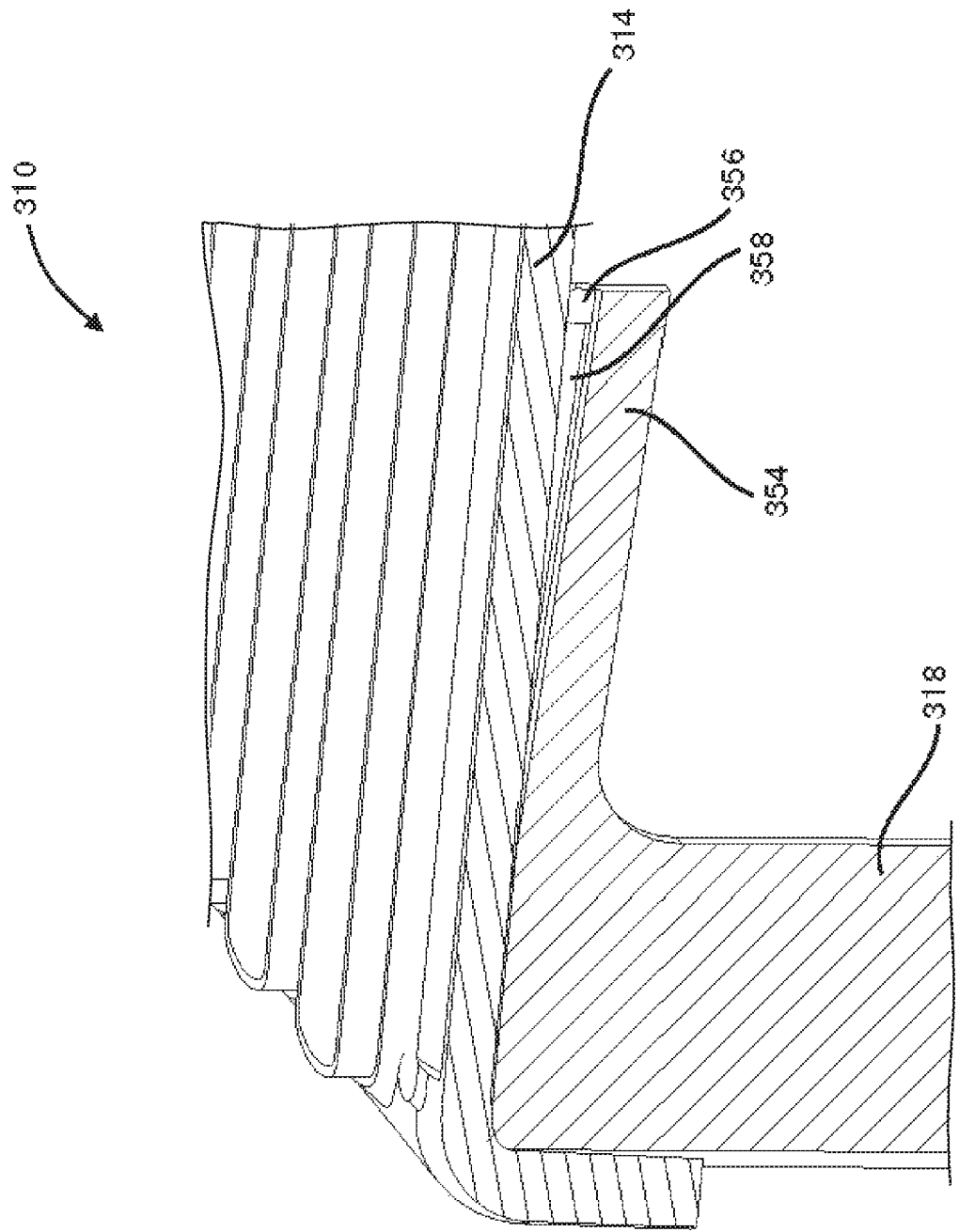
FIG. 13 is a further cross-sectional view of the heat exchanger of FIG. 12 showing the coolant jacket arm in a second position.

FIGS. 11, 12 and 13 show a fifth embodiment. Features corresponding to those of previous embodiments have been given corresponding reference numbers with the additional prefix "3". Only features that differ from those of the previous embodiment are discussed in more depth.

In this embodiment, the coolant jacket first end 352 has an arm 354 extending substantially parallel to the first plane of the header plate 314. The arm 354 has a free end 354a and a protrusion 356 extending from the free end 354a towards the header plate 314.

An air cavity between the coolant jacket 318 and the header plate 314 is shown in FIG. 12 at 358. The cavity 358 appears due to a lack of compression in the core. The protrusion 356 is in contact with the underside of the header plate 314. The protrusion 356 is in contact with an inner face 357 of the header plate 314. The protrusion 356 extends into the air cavity 358 to assist the prevention of leakage.

In this embodiment, the arm 354 is flexible. Advantageously, when core compression increases, so that the arm 354 flexes to allow full core compression, so that the coolant jacket 318 moves against the header plate 314 as shown in FIG. 13, and the air cavity 358 decreases. The protrusion 356 continues to act to seal the air cavity 358.

Figure 14:
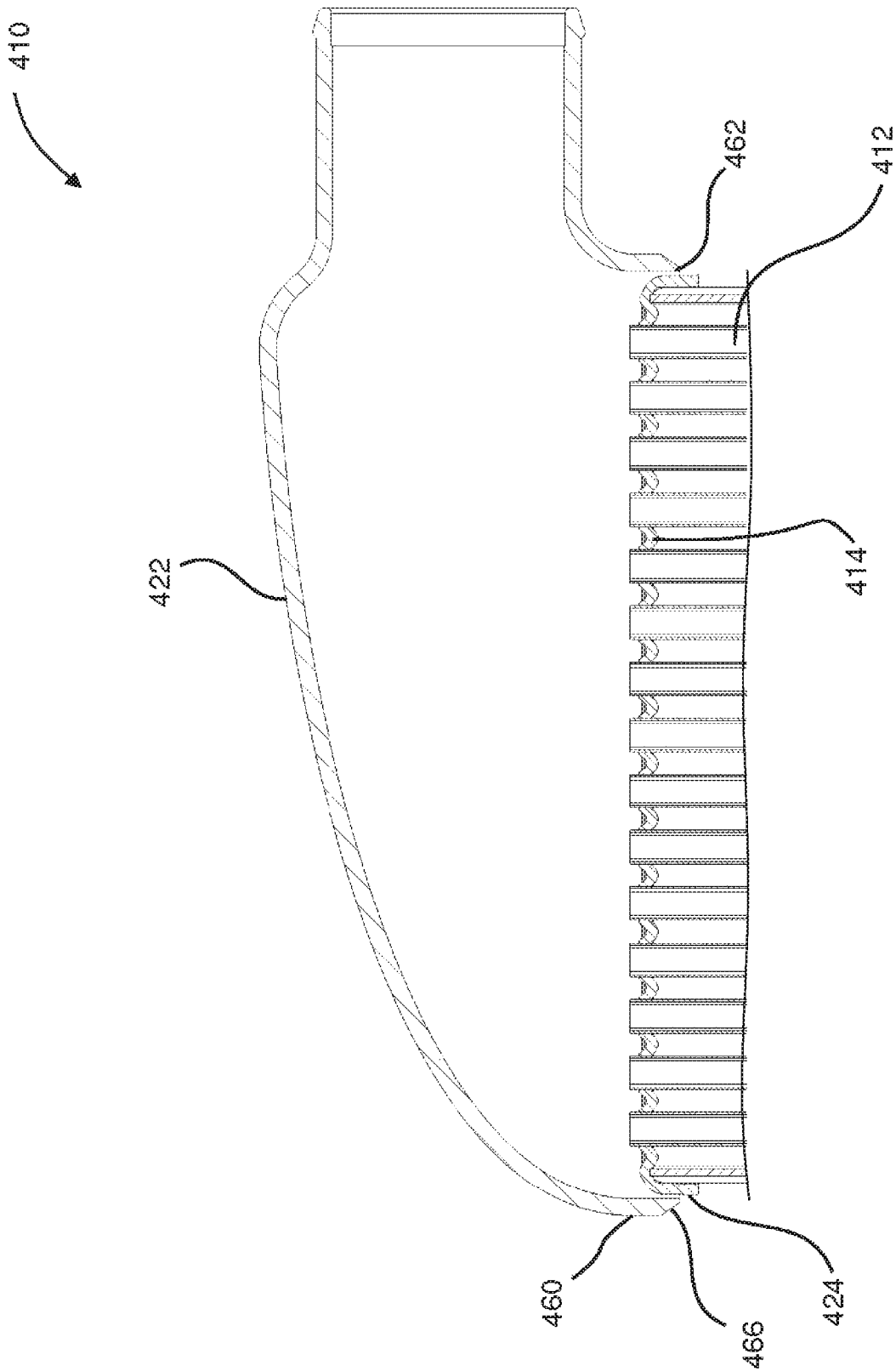
FIG. 14 is a cross-sectional view through a heat exchanger according to a sixth embodiment.
Figure 15:
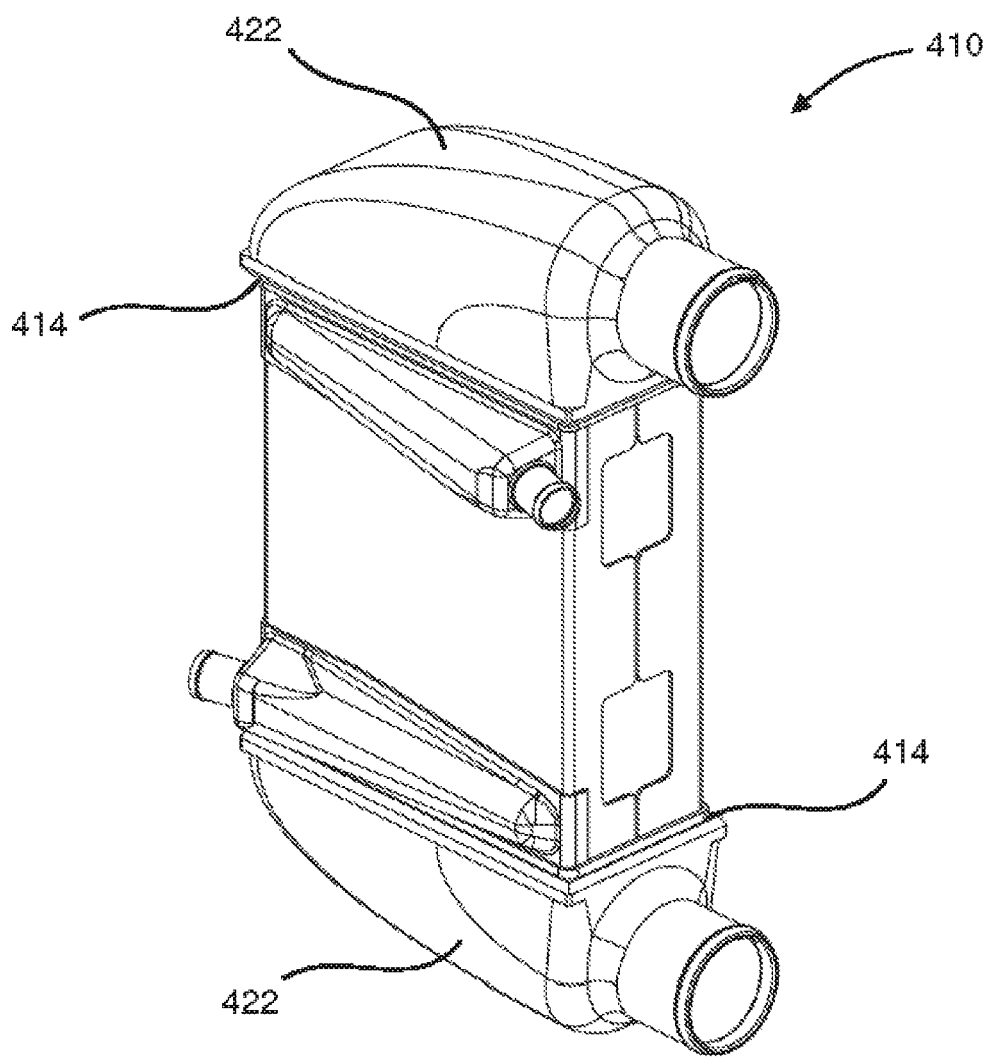
FIG. 15 is an isometric view of the heat exchanger of the embodiment of FIG. 14.

FIGS. 14 and 15 show a sixth embodiment. Features corresponding to those of previous embodiments have been given corresponding reference numbers with the additional prefix "4". Only features that differ from those of the previous embodiment are discussed in more depth.

FIGS. 14 and 15 show the heat exchanger 410 with an inlet tank 422 fitted thereto. FIG. 15 shows an outlet tank 422 fitted to the end of the heat exchanger 410 opposing that of the inlet tank 422. The outlet tank 422 is secured to the remainder of the heat exchanger in the same way as described below in relation to securing of the inlet tank 422 to the remainder of the heat exchanger 410.

The tank 422 of this embodiment has an outer edge 460 that extends outboard of the header plate flange 424 when the tank 422 is fitted to the remainder of the heat exchanger 410. A bond is formed between the tank edge 460 and the exterior of the flange 424 in order to secure the tank 422 to the header plate 414. In this embodiment, a weld is formed at a weld area 462 that extends around the periphery of the header plate 414. In this embodiment, the tank edge 460 defines an external chamfer 466. The chamfer 466 aids welding of the tank edge 460 to the header plate 414.

The tank edge 460 being configured to fit over the header plate 414, and the tank 422 being welded to the header plate 414, allows the header plate flange 424 to be simple in design, and therefore relatively easy to manufacture. A robust seal can be formed between the tank 422 and the header plate 414 without the need for a complicated header plate 414.

Figure 16:
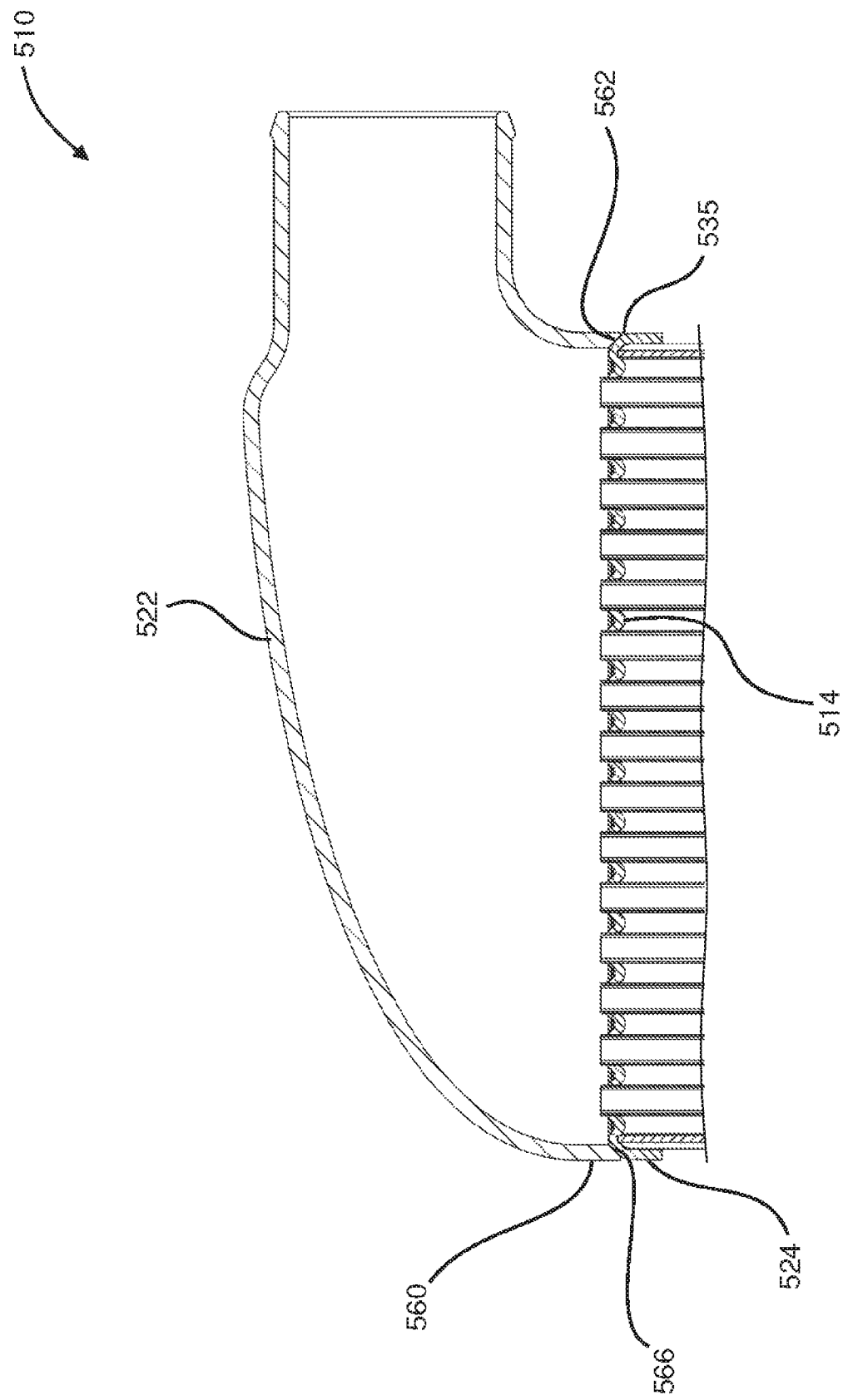
FIG. 16 a cross-sectional view through a heat exchanger according to a seventh embodiment.
Figure 17:
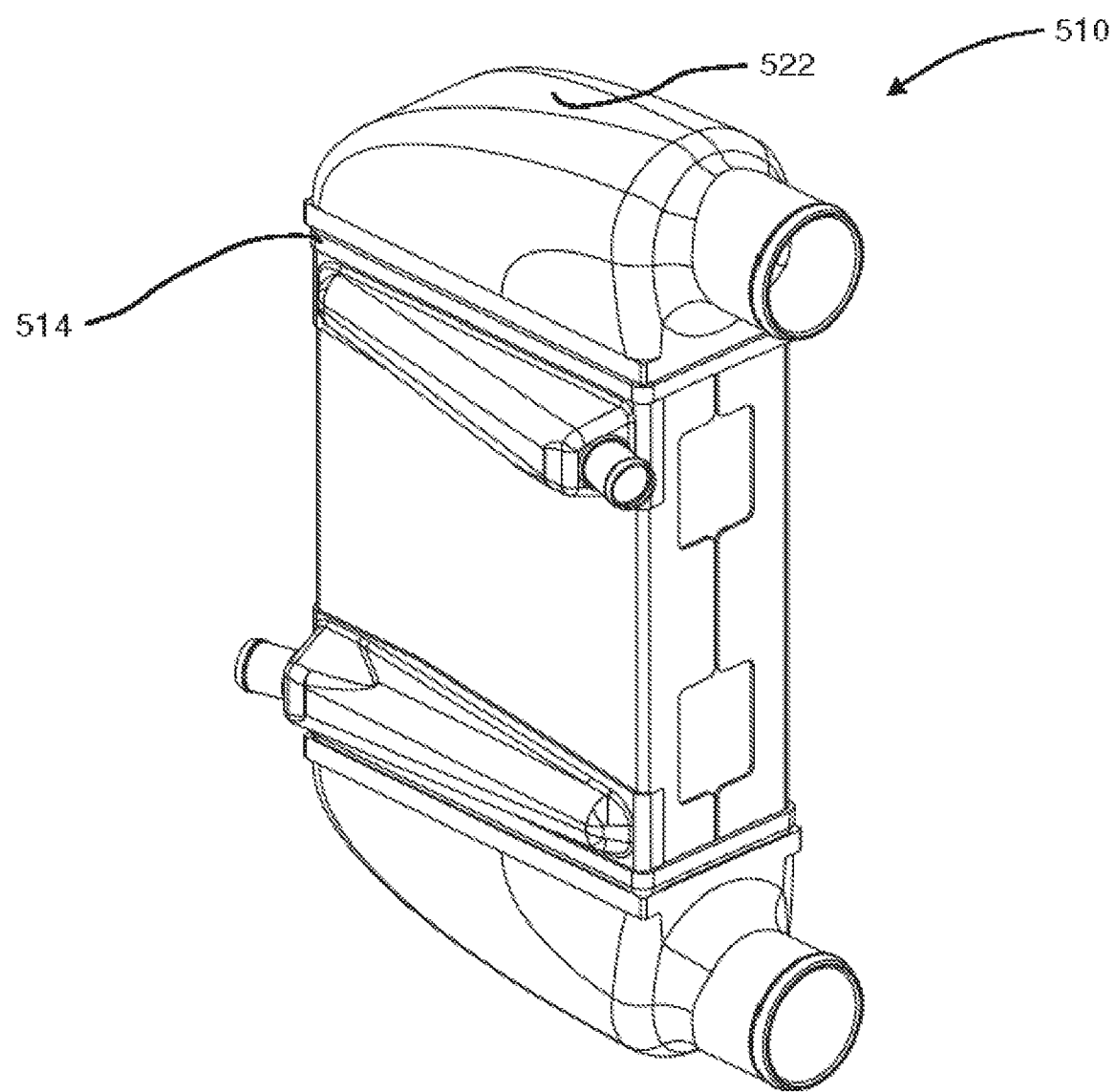
FIG. 17 is an isometric view of the heat exchanger of the embodiment of FIG. 16.

A seventh embodiment is shown in FIGS. 16 and 17. Features corresponding to those of previous embodiments have been given corresponding reference numbers with the additional prefix "5". Only features that differ from those of the previous embodiment are discussed in more depth.

The heat exchanger 510 of this embodiment is similar to that of the sixth embodiment, differing only in the connection of the tank 522 to the header plate 514.

In this embodiment, the edge 560 of the tank 522 meets the header plate 514 at the external curve 535 of the flange 524. The tank 522 is welded to the header plate 514 at a weld region 562 that extends around the periphery of the header plate. In this embodiment, the tank edge 560 defines an internal chamfer 566. The chamfer 566 improves fitting of the tank 522 to the header plate 514 at the external curve 535, and improves the weld of the tank edge 560 to the header plate 514.

Advantageously, fitting the tank 522 to the header plate 514 in this way, and welding the tank 522 to the header plate 514 in this way, allows the header plate 514 to be simple in design and therefore relatively easy to manufacture.

Figure 18:
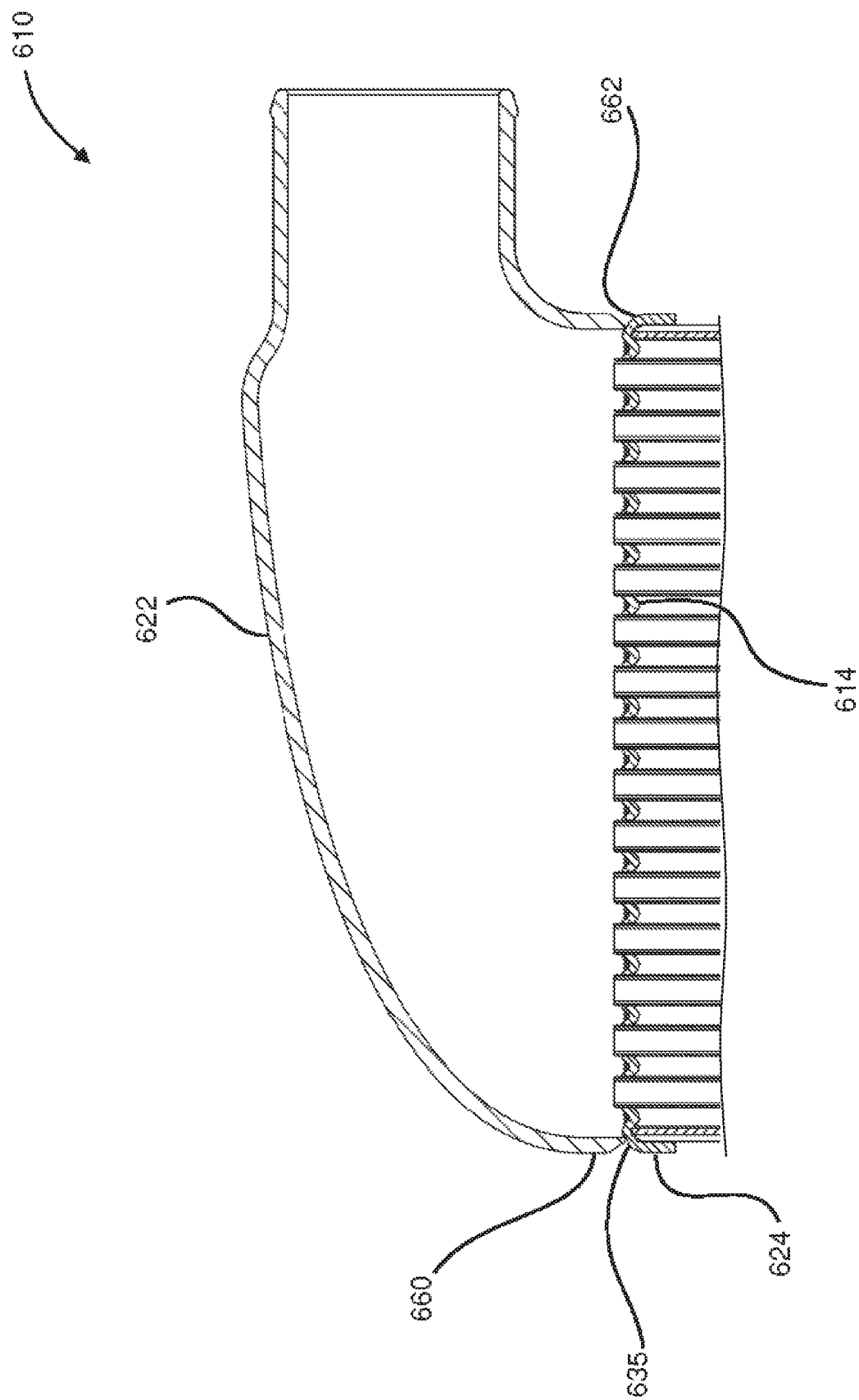
FIG. 18 is a cross-sectional view through a heat exchanger according to an eighth embodiment.
Figure 19:
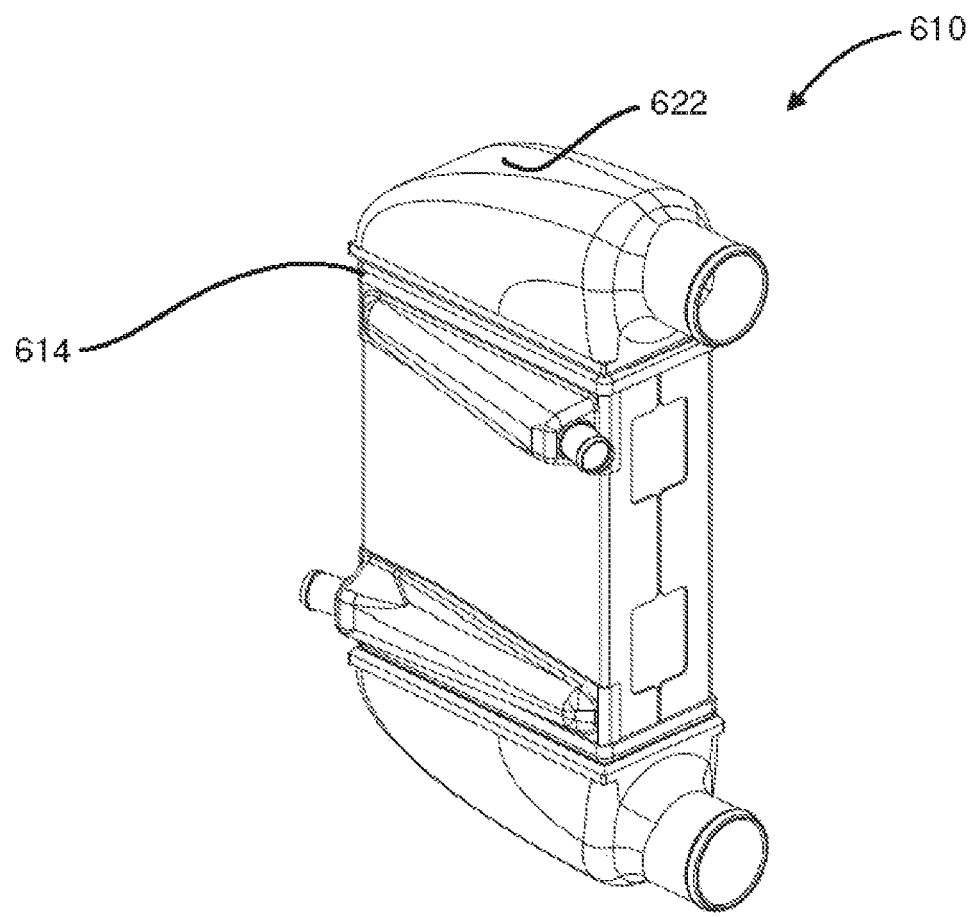
FIG. 19 is an isometric view of the heat exchanger of the embodiment of FIG. 18.

FIGS. 18 and 19 refer to an eighth embodiment. Features corresponding to those of previous embodiments have been given corresponding reference numbers with the additional prefix "6". Only features that differ from those of the previous embodiment are discussed in more depth.

The heat exchanger 610 of this embodiment is similar to those of the sixth and seventh embodiments, differing only in the fitting of the tank 622 to the header plate 614. In this embodiment, the edge 660 of the tank 622 meets the header plate 614 at the external curve 635. A weld region 662 is provided at the point where the tank edge 660 meets the external curve 635. The weld region 662 extends about the periphery of 614. In this embodiment, the tank edge 660 defines an external chamfer in order to aid welding.

Advantageously, fitting the tank 622 to the header plate 614 in this way, and welding the tank 622 to the header plate 614 in this way, allows the header plate 614 to be simple in design and therefore relatively easy to manufacture.

The heat exchanger described above is made of aluminium alloys. In alternative embodiments, some other suitable material is used, such as ferrous or copper alloys.

What is claimed is:

1. A tube type heat exchanger comprising:
    a core comprising a plurality of tubes;
    a header plate defining an array of apertures in which said tubes are received;
    a coolant jacket arranged about said core; and
    a side plate located by the header plate between the core and the coolant jacket,
    wherein the header plate comprises a body defining a central region and an edge region circumferential to said central region, wherein the central region defines said array of apertures, and wherein the edge region comprises a flange;
    wherein the header plate is connected to the coolant jacket via first and second contact areas between the header plate and the coolant jacket; wherein the flange is outboard of the coolant jacket; wherein the first contact area is between the flange and the coolant jacket; and further wherein the second contact area is inboard of the first contact area; and wherein the coolant jacket comprises a first end having a leading end face received by and abutting the header plate at the second contact area, and wherein said first end defines an external chamfer.

2. The tube type heat exchanger of claim 1 wherein the second contact area connects the leading end face and the header plate.

3. The tube type heat exchanger of claim 2 wherein the edge region comprises a transition portion between the flange and the central region of the header plate, the transition portion defining a first internal face; and wherein the second contact area connects the leading end face and the first internal face.

4. The tube type heat exchanger of claim 3 wherein the first internal face comprises a planar surface.

5. The tube type heat exchanger of claim 3 wherein the first contact area connects a flange internal face and an external face of the coolant jacket.

6. The tube type heat exchanger of claim 5, wherein the first internal face and the flange internal face are substantially orthogonal to one another.

7. The tube type heat exchanger of claim 6 wherein the transition portion comprises an external curve.

8. The tube type heat exchanger of claim 1 further comprising braze joints at the first and second contact areas.

9. The tube type heat exchanger of claim 1 further comprising a turbulator and the side plate is adjacent the turbulator, wherein the side plate is located by the header plate between the core and the coolant jacket, wherein the header plate defines a step or shoulder configured to be abutted by an end portion of the side plate.

10. The tube type heat exchanger of claim 1 wherein the header plate defines a slot adjacent the flange at at least one corner; wherein the coolant jacket defines at least one tab; and wherein the slot is configured to receive the at least one tab, wherein the or each slot is curved inwardly towards the interior of the central region.

11. The tube type heat exchanger of claim 1 further comprising a charge air inlet or outlet tank mounted on the header plate, wherein the tank comprises a tank edge that extends adjacent to and outboard of the flange, further comprising a bonded connection between the tank edge and the flange, wherein the bonded connection is a weld, and the tank edge comprises an external chamfer at the bonded connection.

12. The tube type heat exchanger of claim 1 further comprising a charge air inlet or outlet tank mounted on the header plate; and wherein the tank comprises a tank edge that meets the header plate at an external corner of the flange, further comprising a bonded connection between the tank edge and the flange, preferably wherein the bonded connection is a weld, more preferably wherein the tank edge comprises an internal chamfer or an external chamfer at the bonded connection.

13. The tube type heat exchanger of claim 1, wherein the edge region comprises the flange, a transition portion between the flange and the central region, and a free end;

wherein the central region extends substantially in a first plane, and wherein the flange is substantially orthogonal to said first plane; and wherein the transition portion defines an external curve.

14. The tube type heat exchanger of claim 13 wherein the transition portion defines a first internal face, and wherein the first internal face comprises a planar surface.

15. The tube type heat exchanger of claim 13 further comprising a coolant turbulator and the side plate is adjacent the turbulator, wherein the side plate is located by the header plate between the core and the coolant jacket, wherein the transition portion defines an internal shoulder configured to be abutted by an end portion of the side plate.

16. The tube type heat exchanger of claim 13 further comprising a charge air inlet or outlet tank mounted on the header plate, wherein the tank comprises a tank edge that extends adjacent to and outboard of the flange.

17. The tube type heat exchanger of claim 16 further comprising a bonded connection between the tank edge and the flange, preferably wherein the bonded connection is a weld.

18. The tube type heat exchanger of claim 17 wherein the tank edge comprises an external chamfer at the bonded connection.

19. The tube type heat exchanger of claim 13 further comprising a charge air inlet or outlet tank mounted on the header plate; and wherein the tank comprises a tank edge that meets the header plate at an external corner of the flange.

20. The tube type heat exchanger of claim 19 further comprising a bonded connection between the tank edge and the flange, wherein the bonded connection is a weld.

21. The tube type heat exchanger of claim 20 wherein the tank edge comprises an internal chamfer or an external chamfer at the bonded connection.

22. A method of producing a tube type heat exchanger according to claim 1, the method comprising the steps of:
a) providing a header plate comprising a flange;
b) fitting a coolant jacket about a core comprising a plurality of tubes;
c) inserting the core and the coolant jacket into the header plate such that the flange extends external to the coolant jacket; and
d) creating first and second braze joints between the edge region and the coolant jacket.

* * * * *